United States Patent
Kakadia et al.

(10) Patent No.: US 7,821,923 B2
(45) Date of Patent: Oct. 26, 2010

(54) OPTIMIZED SIP ROUTING ARCHITECTURE USING AN INTEGRATED NETWORK AND SYSTEMS APPROACH

(75) Inventors: Deepak Kumar Kakadia, Union City, CA (US); Benjamin Parker, Foster City, CA (US)

(73) Assignee: Cellco Partnership, Basking Ridge, NJ (US)

( * ) Notice: Subject to any disclaimer, the term of this patent is extended or adjusted under 35 U.S.C. 154(b) by 288 days.

(21) Appl. No.: 12/026,989

(22) Filed: Feb. 6, 2008

(65) Prior Publication Data

US 2009/0196183 A1    Aug. 6, 2009

(51) Int. Cl.
    G01R 31/08    (2006.01)
(52) U.S. Cl. .................. 370/221; 370/228; 370/389; 370/401; 709/229; 709/239; 709/243
(58) Field of Classification Search .............. 370/228, 370/230, 395.2, 395.21, 389, 217, 218, 219, 370/221, 352, 356, 360, 401, 392; 709/238, 709/224, 226, 239, 243
    See application file for complete search history.

(56) References Cited

U.S. PATENT DOCUMENTS

| | | | | |
|---|---|---|---|---|
| 6,157,648 | A * | 12/2000 | Voit et al. ................... | 370/401 |
| 2004/0052212 | A1 * | 3/2004 | Baillargeon ................. | 370/401 |
| 2004/0071084 | A1 * | 4/2004 | El-Hennawey et al. ...... | 370/230 |
| 2004/0199664 | A1 * | 10/2004 | Feldman et al. ............. | 709/238 |
| 2005/0129026 | A1 * | 6/2005 | Chang et al. ............. | 370/395.2 |
| 2005/0281204 | A1 | 12/2005 | Karol et al. | |
| 2006/0111115 | A1 | 5/2006 | Marin et al. | |
| 2006/0176805 | A1 * | 8/2006 | Peters ........................ | 370/228 |
| 2007/0041364 | A1 | 2/2007 | Kakadia | |
| 2007/0076591 | A1 | 4/2007 | Khan | |
| 2007/0140262 | A1 | 6/2007 | Wang | |
| 2007/0180104 | A1 | 8/2007 | Filsfils et al. | |
| 2007/0195788 | A1 * | 8/2007 | Vasamsetti et al. ...... | 370/395.21 |
| 2008/0002716 | A1 | 1/2008 | Wiley et al. | |

(Continued)

OTHER PUBLICATIONS

Jung et al., "Session & Connection Management with SIP and RSVP-TE for QOS-guaranteed Multimedia Service Provisioning", May 23, 2005, all.*

(Continued)

Primary Examiner—Kwang B Yao
Assistant Examiner—Jeffrey M Rutkowski
(74) Attorney, Agent, or Firm—McDermott Will & Emery LLP

(57) ABSTRACT

Session initiation protocol (SIP) control traffic routing decisions, such as rapid failure detection and recovery mechanisms, are based on detection of events and/or conditions that may result in suboptimal performance. The disclosed approach ensures that the SIP traffic is routed or rerouted on an optimal basis. Sample inputs to the SIP routing decisions, include integration with BFD, system metrics and other criteria to determine network and systems conditions, for dynamic decisions on where to optimally route SIP traffic. Examples leverage the B2BUA model, which maintains call state and participates in call processing, however, the examples introduce an improved routing model that is able to not only reroute SIP traffic based on failures but also upon the detection of other suboptimal conditions, e.g. excessive cost. The exemplary techniques provide significant savings by ensuring SIP peering decisions are automatically performed considering costs of peering arrangements, congestion and/or other criteria.

18 Claims, 17 Drawing Sheets

U.S. PATENT DOCUMENTS

2008/0089324 A1* 4/2008 Polk et al. ............... 370/389
2008/0219262 A1* 9/2008 Roay ...................... 370/392

OTHER PUBLICATIONS

D. Katz et al. "General Application of BFD draft-ietd-bfd-generic-03.txt", Network Working Group, Mar. 2007, 17 pages.

Donovan et al. "Session Timers in the Session Initiation Protocol (SIP)" Network Working Group, RFC 4028, Apr. 2005.

Rosenberg, et al. "SIP: Session Initiation Protocol", Network Working Group, Jun. 2006, 269 pages.

Katz et al. "Bidirectional Forwarding Detection draft-ietf-bfd-base-06.txt" Network Working Group, Mar. 2007, 49 pages.

International Search Report and the Written Opinion of the International Searching Authority issued in International Patent Application No. PCT/US2009/033430 dated Apr. 3, 2009.

Jiri Kuthan "Sample Uses of SIP Info with Varying Reliability Needs", Internet Engineering Task Force, Oct. 17, 1999.

Rahul Aggarwal, "Applications of Bidirectional Forwarding Detection (BFD)" RFC 3261, Juniper Networks, 2003, 34 pages.

* cited by examiner

OPTIMIZED SIP ROUTING ARCHITECTURE USING AN INTEGRATED NETWORK AND SYSTEMS APPROACH

TECHNICAL FIELD

The present subject matter relates to communications networks supporting multimedia sessions over packet transport and more particularly to techniques and equipment to monitor parameters relating to communications with network components involved in session signaling and to dynamically route/reroute signaling traffic in an effective manner.

BACKGROUND

Modern public telecommunications networks are rapidly migrating from circuit switched technologies utilizing time division multiplexing to packet switched transport, for all communications traffic. For many application services, such a telephone service, video phone service and a variety of other multimedia services, the packet implementations of the public networks utilize the session initiation protocol (SIP) to control communications to and from end users devices. Essentially, SIP is an application-layer control protocol used to set-up, change and/or tear-down any of a variety of different types of multimedia sessions through a packet switched network. The actual multimedia communications typically utilize other application-layer protocols. Packets containing SIP signaling messages are transported through the packet switched network in essentially the same manner as other packets. However, because of the critical nature of such signaling messages, mechanisms have been developed to reroute or resend SIP signaling messages in the event of failures in communication of such messages.

The relevant standard, e.g. as set forth in Internet Engineering Taskforce (IETF), *RFC 3261 SIP: Session Initiation Protocol*, June 2002, does not adequately address congestion, optimization, failure detection and recovery mechanisms for mission critical applications, such as wireless and/or wireline service providers, where SIP is a key protocol for many critical real time applications. Internet Engineering Taskforce (IETF), *RFC Session Timers in the Session Initiation Protocol (SIP)*, April 2005, proposed an extension of the standard to determine if a SIP session is still active. The current technology for SIP rerouting relies on expiration of timers and associated retransmissions. If there is no acknowledgement received before the applicable timer expires, there is a retransmission of the unacknowledged SIP message. The current failure detection and recovery mechanisms have fundamental limitations for carrier-class networks where five-nines (99.999%) reliability is required to deploy SIP architectures into production environments.

More specifically, the SIP client, which can be executing as a process on a device in a mobile switching center for example, or a mobile device, reaches the remote SIP proxy, via various SIP servers, or back-to-back user agent (B2BUA) functions. The current SIP specifications use retransmission timers, increased command sequence (Cseq) numbers, and Positive ACKs to detect a failed B2BUA, and initiate appropriate recovery action. The typical sequence of failure detection and recovery involves activation of a SIP retransmission timer, relative to the first B2BUA (B2BUA1) on the first UAC (UAC1), when a new SIP request is received and a dialog is initiated with a second B2BUA (B2BUA2), for example a remote base station controller on a peering network. A particular SIP session is uniquely identified by the Call-ID and Cseq combination of values, hence this is the state information maintained by UAC1 and the remote peer UAS2. If a B2BUA involved in the session fails or if network connectivity with B2BUA1 fails, then the retransmit timer in UAC1 will time out. Expiration of the retransmit timer in UAC1 causes the UAC1 to initiate retransmission of the SIP message. The retransmission sequence includes an increase in the timer value, using a backoff exponential algorithm. The retransmission sequence typically will take on the order of seconds to tens of seconds, which is clearly unacceptable in a service provider network offering real time services, such as voice or video. During this time window, there is potential loss of call revenue if calls are not processed in a timely manner. Another problem, is that the backup SIP servers are statically configured, so the server is never sure it is the optimal SIP router to accept traffic with the given dynamic changes that occur in the network and servers. Hence, current technology reacts very slowly to changes in the control plan, such as failures or congestion (network or servers), which results in loss of revenue if calls are not processed in a timely manner.

Further, there are no optimizations methods possible with the current technologies. For example there may be a reason why the service provider may want to dynamically divert SIP traffic to improve performance, but there is no mechanism to reroute SIP traffic other than the timer based mechanism outlined above.

Hence a need exists for an improved technique to optimally route and/or reroute SIP traffic in a more dynamic and real time manner.

SUMMARY

The teachings herein alleviate one or more of the above noted problems with routing of SIP signaling traffic. Methods, equipment and programming are disclosed to dynamically implement routing decisions, such as rapid failure detection and recovery mechanisms, for SIP control traffic based on detection of events and/or conditions that may result in suboptimal performance.

For example, the specification discloses a method of selectively routing signaling messages related to one or more multimedia sessions for at least one user, through a packet communication network. Such a method may involve monitoring at least two parameters relating to communications of session initiation protocol (SIP) signaling messages with each of a number of SIP signaling nodes via the packet communication network. One of the SIP signaling nodes is identified as having optimal communications of SIP signaling messages, based on the monitoring of parameters. The method then entails communication of SIP signaling messages regarding one or more of the multimedia sessions with the identified SIP signaling node via the packet communication network.

The specification also discloses a method of selectively rerouting signaling messages related to one or more multimedia sessions for at least one user, through a packet communication network, for example, which supports rapid failure detection and recovery. The rerouting method involves communicating SIP signaling messages regarding one or more of the multimedia sessions with a first SIP signaling node via the packet communication network and monitoring at least two parameters relating to communication of the SIP signaling messages with the first SIP signaling node. Based on the monitoring of parameters, a determination can be made when communication of the SIP signaling messages with the first SIP signaling node is interrupted or is subject to less than a desired level of performance, e.g. is suboptimal. In response to this determination, an alternate second SIP signaling node is selected, and the communication of the SIP signaling messages is transferred from the first SIP signaling node to the second SIP signaling node.

Examples leverage the back-to-back user agent (B2BUA) model, which maintains call state and participates in call processing. For example, the routing/rerouting may be implemented in a session border controller (SCB) that serves as a B2BUA. Parameters that may be considered in the decision making process may include any or all of: availability/unavailability status of communication with each of the SIP signaling nodes; congestion with respect to communication with each of the SIP signaling nodes; latency impacting communication with each of the SIP signaling nodes; and cost of communication with each of the SIP signaling nodes. Monitoring of status and latency can be implemented by extending Bidirectional Forwarding Detection (BFD) capabilities up to the SIP signaling node level.

Although the discussions above have focused on various techniques intended to facilitate dynamic routing decisions for SIP signaling traffic, those skilled in the art will appreciate that concepts discussed herein are also embodied in network elements such as session border controllers and/or programming for devices that would make routing decisions for SIP signaling traffic.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The detailed examples discussed below provide a technology to optimize SIP traffic routing based on network and systems parameters, rather that on statically defined next hop SIP servers as in the current technology. Networking and system conditions change dynamically. To compensate for these dynamic fluctuations, a technique is provided to monitor key network and system parameters and dynamically adjust or tune SIP routing decisions. In particular the disclosed examples improve the selection of SIP Peering Servers by considering multiple measurements, that provide accurate information on the state of the network and systems to determine the optimal SIP routing plan. The SIP routing approach presented by way of example below further improves optimization by also considering other factors, such as transport costs, company policies, etc., to influence the SIP routing decisions.

The exemplary solution disclosed in more detail below monitors the status and other conditions of key components in the signaling plan, such as network congestion and server delays. The SIP traffic can not only be diverted based on failures, but also be diverted based on best path optimization parameters. The cost of communications with various SIP signaling nodes may also be included as one of the parameters in the routing decisions. Based on detected conditions/parameters, the network can automatically route SIP traffic quickly to optimal SIP servers. This will directly improve the reliability and performance of the SIP control plan and result in optimal allocation of network resources. Even in the event of a failure, the recovery is far more efficient as there is no need to delay until a timer expires.

Figure 1:
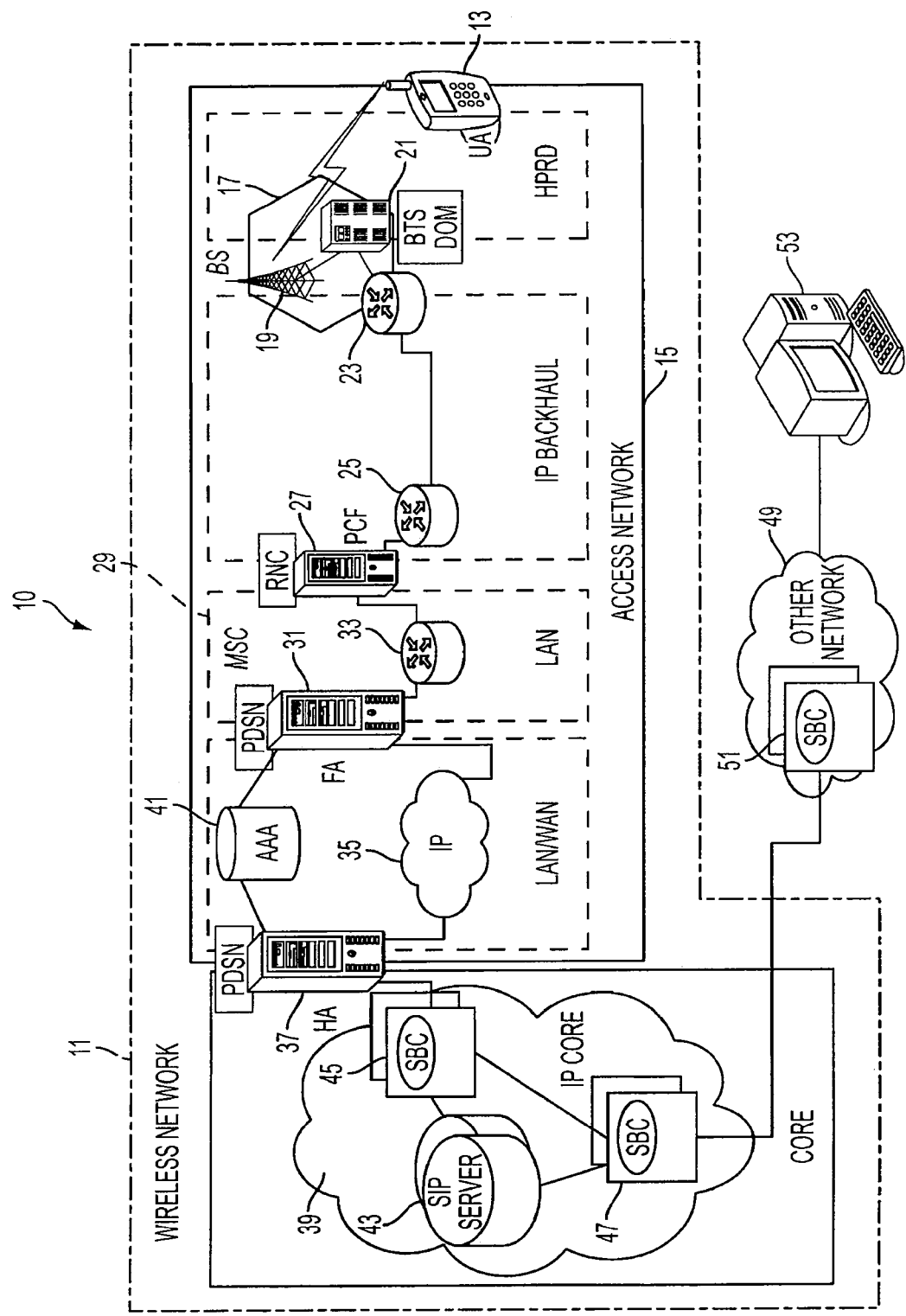
FIG. 1 is a simplified functional block diagram of a packet communication network that provides multimedia communications and utilize the session initiation protocol (SIP) to control the multimedia sessions for one or more client devices.

With that overview, it may be helpful to consider an example of a system that may utilize the dynamic session signaling routing techniques, such as the packet communication network 10 shown in FIG. 1, in somewhat more detail. The overall network 10 includes a number of networks operated by different entities. In the examples, the various networks are operated by different network service provides or "carriers." The network 10 utilizes packet transport and SIP signaling for session control purposes.

One such carrier-class network is shown at 11 in the first drawing. Although applicable to other packet communication networks, the example depicts a packet based communication network 11 for providing mobile wireless communication services, using a 3GPP2 1xEV-DO network architecture. As discussed below, the network 11 interconnects with at least one other packet communication network utilizing SIP signaling. The functional block diagram shows elements of the exemplary wireless mobile communication network 11, for providing packet based services, for multimedia applications such as mobile voice telephone services based on VoIP type packet communications, as well as video and/or other multimedia services. The drawing shows network elements in high-level functional block diagram form.

The wireless communication network 11 provides packet communication services for numerous mobile stations, although for discussion purposes, the drawing shows a single device 13. The mobile device 13, sometimes referred to as a mobile User Agent (UA), typically runs one or more 'client' programs for implementing the agent functionality with respect to one or more communication services that the user obtains or subscribes to through the network 11. The mobile device 13, for example, may take the form of a mobile telephone station, with display and user input capabilities to support multimedia communications. Today, such mobile telephones implementations of the device 13 typically take the form of portable handsets, although they may be implemented in other form factors. As another class of station examples, the mobile device 13 may take the form of a personal digital assistant (PDA) or a portable personal computer (PC), incorporating a wireless transceiver compatible with the particular type of wireless packet data service offered by the network 11. Of course, the mobile stations may take other forms or connect to a variety of other data devices that may enable use of the communication services of network 10.

The network 11 includes or implements one or more radio access networks 15, for wireless communications with the mobile devices 13 receiving service via the network 11. Physical elements of a radio access network 15 include a number of base stations (BSs) 17, only one of which is shown for convenience. Each base station 17 includes an antenna system 19 and a base transceiver system (BTS) 21. The base transceiver system (BTS) 21 communicates via the antenna system 19 and the air-link with one or more of the mobile stations 13, when the mobile stations are within range. The BTS 21 is the part of the radio network that sends and receives radio frequency signals carrying packets to/from the mobile stations that the base station 17 currently serves. The BTS communications over the air link with the UA wireless client device 13 provide the High Rate Packet Data Interface (HPRD) for client data services. From the mobile station perspective, there will often be two or more base stations within range. The mobile device 13 communicates through the BTS 21 of base station 17, selected from among those base stations that it can detect (approximately within range) over the air, ending up with the BTS 21 that provides the best Channel-to-Interference ratio.

The BTS 21 includes or is associated with a DOM (data optimized module) that controls the wireless packet communications through the BS and the HPRD wireless domain, including scheduling of packet transmissions on the forward link(s), in this example of the wireless portion of the network 11. The IP backhaul segment connects the BTS to the Radio Network Controller (RNC) 27, typically located in a Mobile Switching Center (MSC) 29. This wireline segment, for example, may utilize Metro Ethernet connections provided by Regional Service providers to provide IP transport, as represented generally by routers 23, 25 and the links therebetween, for packet routing to and from the BTS 21 and the RNC 27 at the MSC 29.

The network 11 also includes a number of Packet Data Serving Nodes or "PDSNs" in CDMA type networks (or GGSN deployed in GSM networks). In the MSC 29 serving the mobile device 13, the PDSN 31 serves as a foreign agent (FA). The PDSN is in packet communications with the RNC 27, e.g. via a local area network (LAN) within the MSC 29 represented generally by another router 33. The foreign agent PDSN 31 establishes, maintains and terminates logical links to the associated portion of the radio access network. The PDSN also supports point to point protocol (PPP) sessions with the mobile stations 13. The PDSN provides the packet routing function from the radio network to/from other packet switched networks, in this case via the IP network 35 providing local area network (LAN) to wide area network (WAN) connectivity from the MSC 29 to a home agent (HA) PDSN 37, which in turn provides packet routing to/from an IP core network 39, e.g. for Internet or Intranet access.

The agents 31 and 37 are coupled to an Authentication, Authorization, and Accounting (AAA) system 41. At one or more points in the processing of a call or other communication session, the PDSN FA 31 or the HA 37 accesses the AAA server 41 to obtain call access authorization, and the FA and HA provide information regarding the duration/volume of use during the session, to the AAA server for accounting purposes.

The illustrated network 10 utilizes SIP as the signaling protocol for control of multimedia sessions or "calls" to and from the users' mobile stations 13 receiving service through the network. For that purpose, the core network 39 includes or provides secure communications with several elements utilized to implement relevant SIP signaling communications functions. SIP related elements, under discussion here, are shown; although other elements of the core network 39 such as routers, firewalls, etc. are omitted for convenience. In the example, the core network 39 implements one or more SIP servers 43, e.g. for SIP signaling to and from the UA functionality in the client mobile station devices 13.

The exemplary core network 39 also implements a number of Session Border Controllers, as shown in this first example at 45 and 47. In the context of packet switched carrier networks, a Session Border Controller or "SBC" is a device used at a line of demarcation between networks to control at least the signaling and often the media communications, for multimedia communication sessions, such as voice over Internet Protocol (VoIP) calls. Typically, such SBC devices are deployed at the boundary between an access network and a core network and/or between different core networks (e.g. at the interconnect between core networks of different carriers). In the example, the SBC 45 is one such device deployed at the boundary between the radio access network 15 and the core network 39, whereas the SBC 47 is one such device deployed at the boundary between the core network 39 and another IP network 49. In a carrier grade network, to provide adequate capacity and/or to provide redundancy and thereby insure a high degree of service availability, there will typically be a number of different servers 43 and there will usually be a number of SBCs 45, 47 implemented at each border or demarcation line.

The other IP network 49 may be a public or private network. In the example, the IP network is that of another carrier or service provider. Although elements of the network 49 are generally omitted, it may be a wireless network implemented in a manner similar to the network 11 or any other type of IP network capable of multimedia session communications. To facilitate SIP based sessions for communications with mobile stations 13 via the network 11, the other network 49 will include one or more SBCs 51 configured as SIP peers with respect to the SBC 47 in the network 11. Sessions through the networks 11 and 49, for example, allow communications for the mobile stations with other user agents (UAs), represented generally by the device shown at 53 in the first drawing. The other UA may be another end user device or a server or the like capable of multimedia communications, or the other device 53 may be a SIP server similar to the server 43.

The SIP client can be executing as a process on a device in a mobile switching center 29 or on a mobile station 13. Handling of SIP signaling message traffic typically involves forwarding of the messages from at least one SIP device to another. Hence, any given SIP signaling message reaches the remote SIP proxy 43 or 53, via various SIP servers operating as back-to-back user agent (B2BUA) functions; and responses are forwarded back in a similar manner. The B2BUA functions may reside on a server 43 in the core network 39, although in many cases, the B2BUA functions are implemented in the various SBCs.

The network 10 dynamically implements routing decision for various SIP control signaling traffic based on detection of events and/or conditions that may result in suboptimal performance. For that purposes, one or more of the SIP signaling nodes monitors two or more parameters relating to communications of SIP signaling messages with other SIP signaling nodes. One of the SIP signaling nodes is identified as having optimal communications of SIP signaling messages, based on the monitoring of parameters and SIP signaling messages regarding one or more of the multimedia sessions are communicated with the identified SIP signaling node. This can include initiating signaling communication with another node, i.e. initial SIP routing. The technique can also be used for rerouting SIP control signaling traffic, for example, for rapid failure detection and recovery. Rerouting can occur when there is an interruption or when the communication of the SIP signaling messages with a particular SIP signaling node is subject to less than a desired level of performance, e.g. falls to some level that is deemed suboptimal. Performance may relate to operational performance, such as availability status of communications with a particular node or congestion or latency impacting communications with a particular SIP signaling node. Performance also may relate to an aspect of commercial performance, e.g. cost of communications with a particular SIP signaling node.

Hence, in the example, decisions for routing of SIP traffic signaling between devices such as 43, 45, 47 and 51 can be based on network and systems parameters, and routing decisions can be implemented dynamically as conditions of the SIP elements change. A technique is provided to monitor key network and system parameters and dynamically adjust or tune SIP routing/rerouting decisions. In particular the disclosed examples improve the selection of SIP Peering Servers by considering multiple measurements, that provide accurate information on the state of the network and systems to determine the optimal SIP routing architecture. The SIP routing approach presented by way of example below further improves optimization by also considering other factors, such as transport costs, company policies, etc., to influence the SIP routing decisions.

Before discussion of specific examples of such monitoring and dynamic routing of SIP traffic, it may be helpful to some readers to consider the definitions of several SIP related terms established by the relevant standards, e.g. Internet Engineering Taskforce (IETF), *RFC 3261 SIP: Session Initiation Protocol*, June 2002.

As defined in RFC 3261, a back-to-back user agent (B2BUA) is a logical entity that receives a request and processes it as a user agent server (UAS). In order to determine how the request should be answered, it acts as a user agent client (UAC) and generates requests. Unlike a proxy server, it maintains dialog state and must participate in all requests sent on the dialogs it has established.

In the SIP protocol, a transaction is a request sent by a client transaction function (using the transport layer) to a server transaction function, along with all responses to that request sent back from the server to the client. The transaction layer handles application-layer retransmissions, matching of responses to requests, and application-layer timeouts. Any task that a user agent client (UAC) accomplishes takes place using a series of transactions.

A dialog is a peer-to-peer SIP relationship between two user agents that persists for some time. A dialog established by SIP messages is identified by a call identifier, local tag, and a remote tag.

A client is any network element that sends SIP requests and receives SIP responses. Clients may or may not interact directly with a human user. User agent clients and proxies are clients. A server is a network element that receives requests in order to service them and sends back responses to those requests. Examples of servers are proxies, user agent servers, redirect servers, and registrars.

A proxy or proxy server is an intermediary entity that acts as both a server and a client for the purpose of making requests on behalf of other clients. A proxy server primarily plays the role of routing, which means its job is to ensure that a request is sent to another entity "closer" to the targeted user. Proxies are also useful for enforcing policy (for example, making sure a user is allowed to make a call). A proxy interprets, and, if necessary, rewrites specific parts of a request message before forwarding it.

A User Agent (UA) is a logical entity that can act as both a user agent client and user agent server. A user agent client (UAC) is a logical entity that creates and sends a new request to a server and receives any response to that request. In turn, a user agent server (UAS) is a logical entity that generates a response to a SIP request, which may accept, reject or redirect the request. The role of UAC and UAS, as well as proxy and redirect servers, are defined on a transaction-by-transaction basis. For example, the user agent (UA) initiating a call acts as a UAC when it sends the initial INVITE request, but that same UA acts as a UAS when receiving a BYE request from the callee. Similarly, the same software can act as a proxy server for one request and as a redirect server for the next request.

Figure 2:
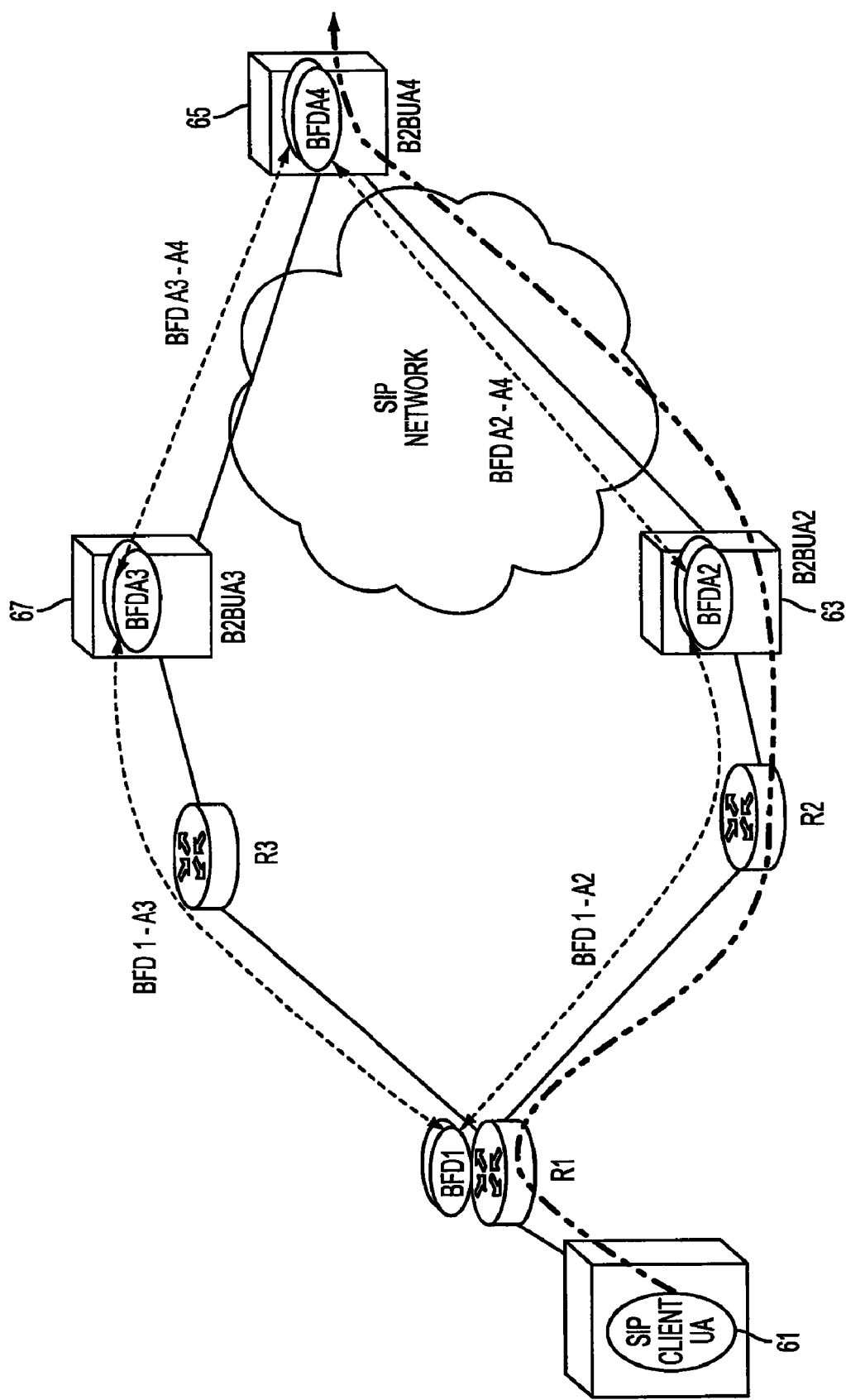
FIG. 2 is a simplified functional block diagram of a portion of a network illustrating SIP client signaling.

Turning now to the example of FIG. 2, the SIP client 61 may be executing as a process on a device in a mobile switching center or a mobile device, and the client 61 communicates with a remote SIP proxy (not separately shown), via various SIP servers, or B2B2UA functions which are typically deployed on Session Border Controllers (SBCs). In FIG. 2, the end to end SIP primary path is shown as the dashed-doubled-dotted line. In the example, this primary path extends through routers R1 and R2 and two representative B2B2UA functions B2B2UA2 (63) and B2B2UA4 (65). If the client 61 is a UA on a mobile station 13, for example, the routers R1 and R2 could be any of the routers 23, 25 and 33 and/or one or more routers in the IP network 35 or the core network 39, in the example of FIG. 1. If the remote SIP proxy is reached via another network, such as the network 49 in the example of FIG. 1, then the B2B2UA2 function 63 might reside in an SBC 45 whereas the B2B2UA4 function 65 might reside in an SBC 47.

The SIP elements monitor various parameters of the communications with other SIP signaling elements for purposes of making SIP route determinations on a dynamic basis. In the example of FIG. 2, the SIP elements rely on a router protocol to periodically check or 'ping' the next hop element, such as the Bidirectional Forwarding Detection (BFD) protocol. BFD is a network protocol used to detect faults between two forwarding nodes. BFD establishes a session between two endpoints over a particular link. If more than one link exists between two systems, multiple BFD sessions may be established to monitor each one of them. Once, established, each node forwards BFD packets to the other, on a periodic basis. A node knows that there has been a failure, of the other forwarding node or of the network connectivity linking the nodes, if the packets stop arriving as expected. BFD was developed for routers, for purposes of making layer three determinations as to the status of other routers. However, the BFD functions are extended here to provide status information to the higher layers of the protocol stack associated with the SIP signaling communications. Hence, in our example, the forwarding nodes are back-to-back user agents (B2BUA), and the BFD functions are extended and used to detect faults between two B2BUA functions.

The example of FIG. 2 therefore includes four exemplary BFD sessions, which are shown as dashed lines. The first BFD session BFD1-A2 is the BFD point to point, unidirectional session between router R1 and B2BUA2 (63). The second BFD session BFD1-A3 is the BFD point to point, unidirectional session between router R1 and B2BUA3 (67). The third BFD session, BFDA2-A4 is the BFD point to point, unidirectional session between B2BUA2 (63) and B2BUA4 (65). Similarly, the further BFD session BFD A3-A4 is the BFD point to point, unidirectional session between B2BUA3 (67) and B2BUA4 (65). Similar BFD sessions are shown in FIG. 3.

The implementation includes extensions to the SIP specification where the SIP traffic can not only be diverted based on failures, but also be routed or diverted based on best path optimization parameters. The illustration in FIG. 2 assumes normal operations via the primary path through routers R1 and R2 and the B2B2UA functions B2B2UA2 (63) and B2B2UA4 (65), and the drawing shows the normal status monitoring through the four BFD sessions. The BFD sessions indicate that the links between the various B2BUA functions and the B2BUA functions themselves are operational. The timing of BFD responses may also be used to determine latencies with regard to the SIP message communications between the B2BUA functions. The status and/or latencies are used to make SIP routing decisions at the B2BUA functions. Other parameters, such as cost, may also be considered.

Figure 3:
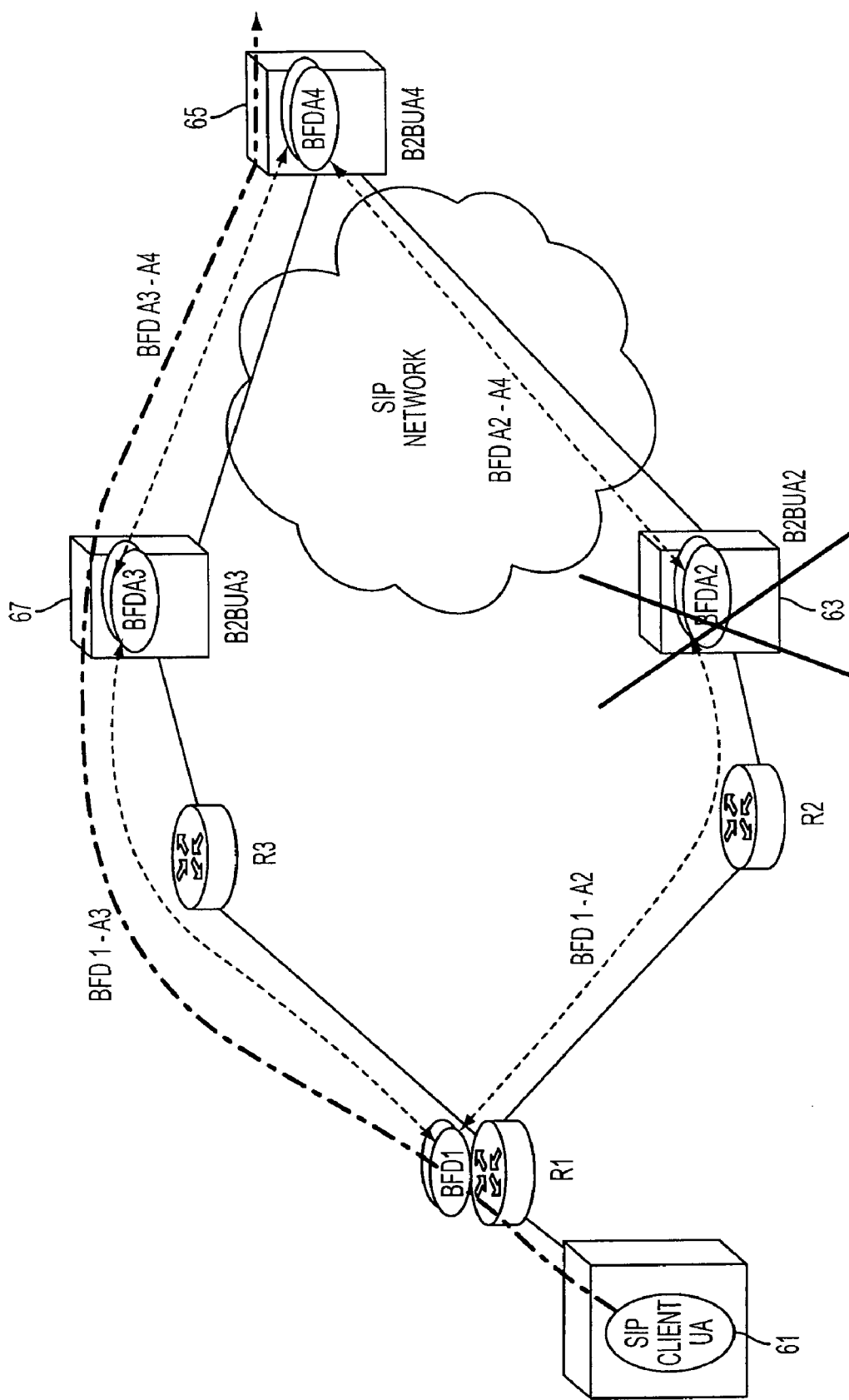
FIG. 3 is a simplified functional block diagram of the network portion of FIG. 2, but showing a failure and attendant rerouting responsive to failure detection.

FIG. 3 is useful in illustrating an event that may cause a dynamic decision to alter the SIP routing. In the example, we will assume that a failure occurs on one of the SBC devices which implement the B2BUA functions, in this example, on the B2BUA2 (63). The B2BUA2 failure may occur due to, either a process, or a network connectivity issue connecting two endpoints between BFD1 and BFDA2. The following describes the sequence of actions when such a failure occurs. The router R1 knows that there is a failure between BFD1 and BFDA2, so it also knows that SIP packets destined to B2BUA2 (63) now is forwarded to B2BUA3 (67), using some pre-configurations done a priori. Hence, the function B2BUA3 (67) now will receive SIP packets, mid session. Since there is no state information associated with this SIP packet, it knows to send a 301 MOVED PERMANENTLY type SIP message to the SIP Client 61, which can be extracted from the SIP header field, or possibly also in some cases the source IP address. The SIP Client 61 therefore receives the SIP 301 MOVED PERMANENTLY message, with the Call-ID SIP header field and Cseq SIP header, identifying a unique transaction. So, the SIP Client 61 will re establish SIP connection with B2BUA3 (67), by issuing an new INVITE message, which the B2BUA3 (67) will use to rebuild new state information for this SIP session. The B2BUA4 function (65) will know that B2BUA2 (63) has failed due to BFD Session BFD A2-A4 indicating the failure. When the B2BUA4 function 65 now receives a new session establish message from B2BUA3 (67), which contains the same Cseq and other parameters, it knows that the identified SIP session has now moved. In this way, the communication between the SIP Client 61 and the B2BUA4 function 65 shifts from the primary route (FIG. 2) to a secondary route shown as a dot-dash line through the B2BUA3 function 67. The backend corresponding session to the remote proxy server remains intact and decoupled from the effects of this failure.

The use of 301 MOVED PERMANENTLY SIP message to the SIP Client to recognize the new backup SIP B2BUA UAC is based on the following message definition from RFC 3261:

RFC 3261 21.3.2 301 Moved Permanently:

The user can no longer be found at the address in the Request-URI, and the requesting client SHOULD retry at the new address given by the Contact header field (Section 20.10). The requestor SHOULD update any local directories, address books, and user location caches with this new value and redirect future requests to the address(es) listed.

Of course, there are other possible approaches to advising the SIP client of the new Target Backup SIP B2BUA server. For example, the SIP RE-INVITE message may be used as per RFC 3261, which states:

14 Modifying an Existing Session

A successful INVITE request (see Section 13) establishes both a dialog between two user agents and a session using the offer-answer model . . . .

This modification can involve changing addresses or ports, adding a media stream, deleting a media stream, and so on. This is accomplished by sending a new INVITE request within the same dialog that established the session.

The SIP Client 61 of UAC should be able to identify that the original dialog between the SIP Client and B2BUA2 (63) and the new dialog between the same SIP Client 61 and the new backup B2B2UA3 (67) should belong to the same session, so that the client will know that the RE-INVITE message is changing the target SIP server which should now be B2BUA3 (67).

Hence, an implementation as outlined above includes extensions to the SIP specification where the SIP traffic can not only be diverted based on failures, but also be diverted based on best path optimization parameters. Other exemplary deployments are described below.

Figure 4:
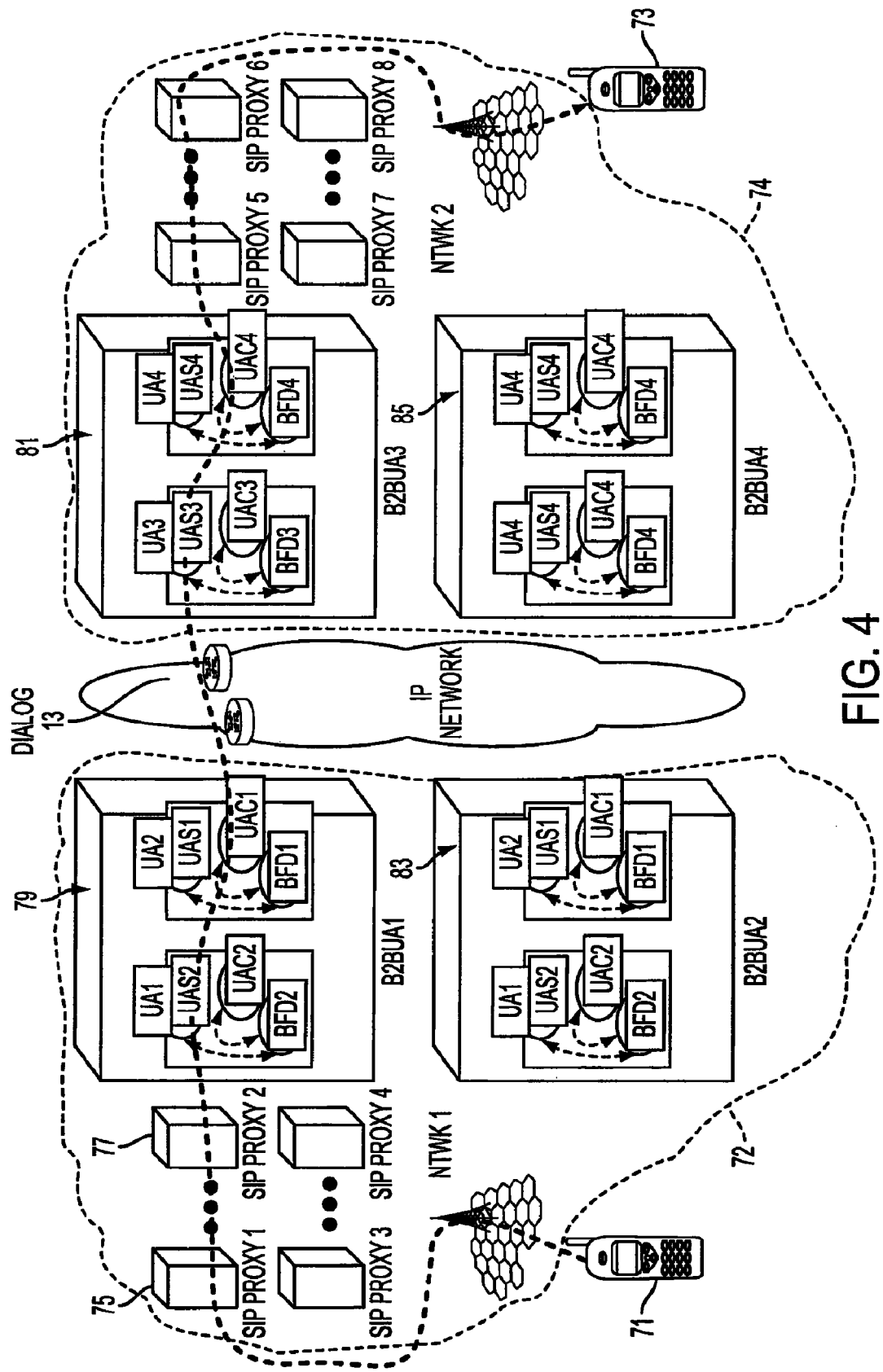
FIG. 4 is a logical network diagram, which includes SIP servers that process and route SIP traffic, in this case illustrating the normal flow for a session between two mobile stations.

FIG. 4 represents a logical network diagram that includes interconnect between two carriers' mobile networks, which includes SIP servers that process and route SIP traffic. This example shows communications between two mobile stations 71 and 73 receiving service from respective carrier networks (Ntwk 1) 72 and (Ntwk) 74. A mobile station 71, will originate a SIP session by first sending an INVITE message through the wireless network (e.g. network 11 of FIG. 1)

to its configured SIP Proxy Server, SIP Proxy 1 (75), which is responsible for forwarding the INVITE to the target mobile station 73 via intermediate SIP Proxies, as shown in the diagram, from SIP Proxy 1 through SIP Proxy 2. In fact there can be n more proxies in-between these 2 SIP proxies, represented in the diagram as 3 dots.

The dashed line from mobile station 71 and the mobile station 73 shows the SIP traffic path, abstracting all the individual SIP messages. B2BUA1 (79) and B2BUA3 (81), are typically implemented in SBCs between the carriers networks 72 and 74. Similarly, the carriers' networks will include other B2BUA2 (83) and B2BUA4 (85) functions, typically implemented in other SBCs between the carriers networks 72 and 74, although in our example, the normal session for the mobile stations 71 and 73 does not run through B2BUA2 (83) and B2BUA4 (85). For general cases, the functions are described from a logical perspective, meaning the logical functions can be deployed on any physical box from a practical perspective.

Figure 5:
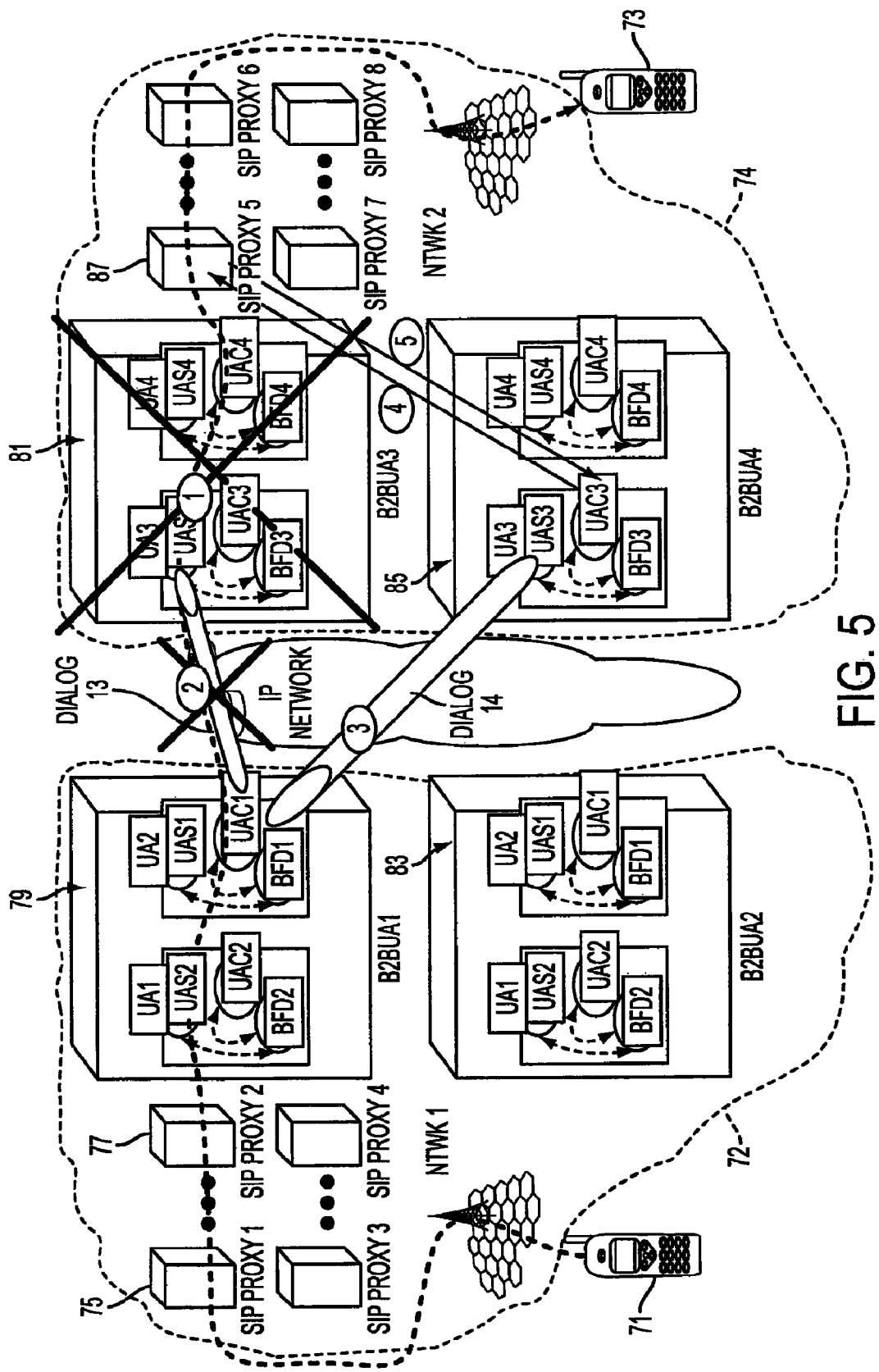
FIG. 5 is a logical network diagram, similar to that of FIG. 4, which also illustrates SIP extensions for rapid SIP traffic diversion.
Figure 6:
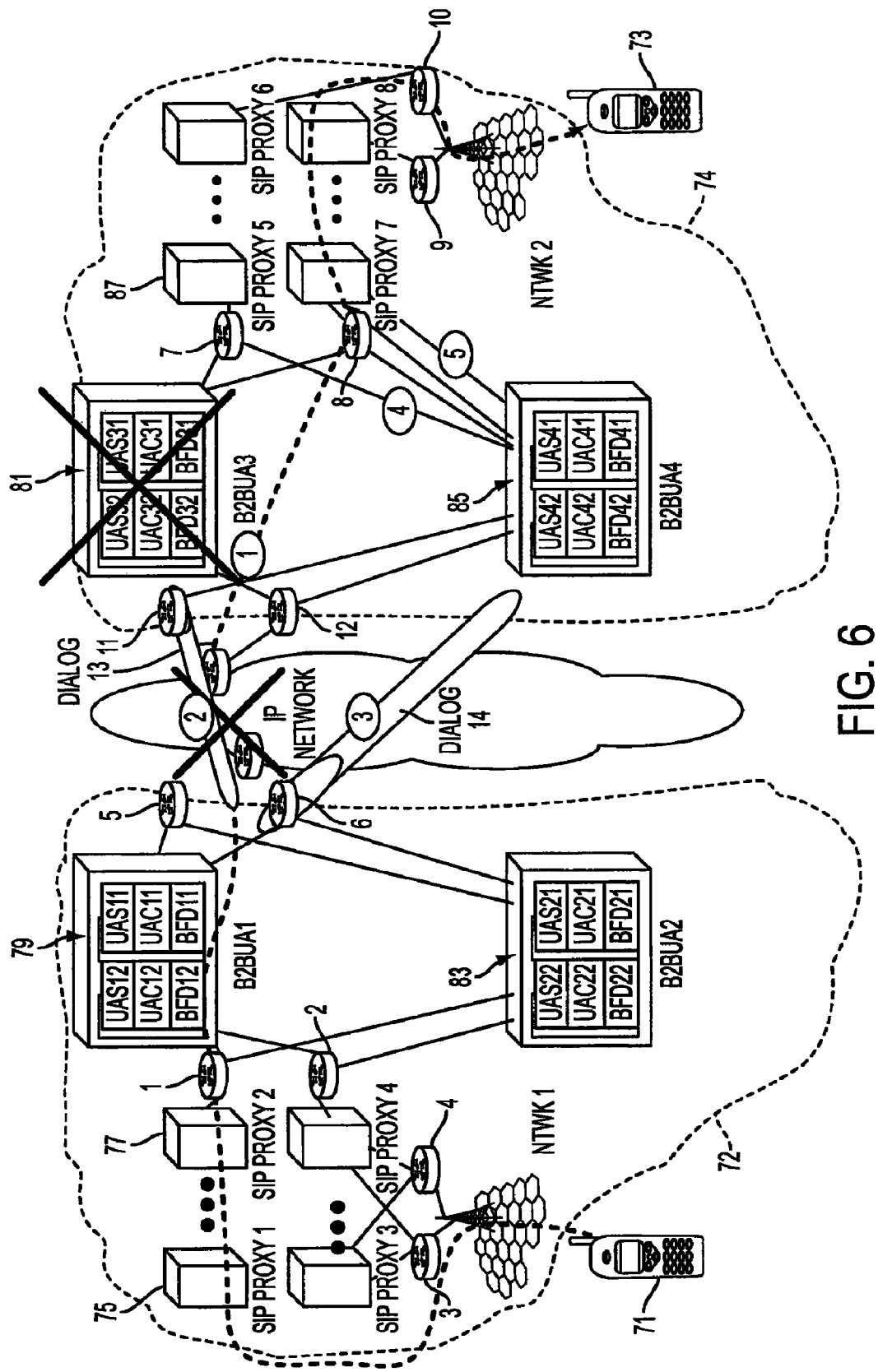
FIG. 6 is a logical network diagram depicting the impact of a failure on originating and terminating networks.

FIG. 5 shows a decoupled architecture and SIP extensions for rapid SIP traffic diversion, and the drawing depicts an event where B2BUA3 (81) fails completely, and SIP traffic is appropriately rerouted. FIG. 6 is a similar diagram, which includes the steps for detecting the failure and rerouting the SIP signaling traffic around the failure, in an optimal manner.

With reference to FIG. 5, assume that at step 1 the B2BUA3 (81) fails, which interrupts the dialog 13 (step 2). The UAC1 in B2BUA1 (79) is notified instantaneously; and at step 3, that UAC1 takes corrective action and sets up an alternate session—in an optimal fashion, using a background process that dynamically maintains, updates an optimal routing table of SIP peers for UAC1. The UAC1 in B2BUA1 (79), using this extended information, will setup a dialog 14 (step 3) and start to forward SIP traffic to B2BUA4 (85).

There may be a problem still. The SIP proxy 5 (87) may have had a session between SIP proxy 5 and UAC3 B2BUA3 (81), which needs to be torn down and a new one created between SIP Proxy 5 (87) and UAC3 in B2BUA4 (85). For this purpose, the SIP Proxy 5 (87) will be aware of the fact that UAC3 in B2BUA4 (85) is the next optimal SIP peer. For this, SIP Proxy 5 (87) consults a dynamic SIP Routing Table to compute its next best optimal SIP peer, based on failures and other optimal criteria.

In FIG. 5 we see that a message (step 4) is sent to SIP Proxy 5 (87) to cause it to now divert SIP traffic to UAC3 in B2BUA4 (85), and to rapidly tear down the session leg from SIP Proxy 5 and UAS3 in the failed B2BUA3 (81). Once SIP Proxy 5 (87) has completed updating its tables, then SIP traffic will now flow from SIP Proxy 5 (87) to B2BUA4 (85) and then continue on to B2BUA1 (79). This decoupled architecture avoids the messy cascading or propagation of failure messages all the way to the head end, by containing the failure locally.

In FIG. 6, we see the impact on the originating and terminating networks. The impact on both networks is minimized, due to the fact that the failure detection and recovery is contained to impact as few nodes as possible—a minimal set of routers, and any cascading effect is kept at a minimum. We see that if there is a failure with either B2BUA3 (81) and/or the network link between B2BUA3 (81) and B2BUA1 (79), the originating network 72 diverts SIP traffic from router 5 to router 6, only to be able to reach the backup B2BUA4 device 85. There is no failure mechanism required at the router level, the IP packets will have a different IP address, so the network will itself do simple IP packet forwarding based on route advertisements and installed in the routing tables. On the terminating network, there is slightly more impact, in this case if the B2BUA3 (81) fails, the adjacent SIP Proxy now routes to the backup B2BUA4 (85) instead of the failed B2BUA3 (81), which involves again simple IP routing of SIP traffic to a different IP destination address corresponding to B2BUA4 (85).

The example for continuously and automatically finding the optimal SIP routing paths involves taking a measurement of parameters (e.g. status, congestion, latency, etc.) relating to health of all the SIP network links and servers, and based on the best paths, the SIP UAC and UAS will decide, in near real-time where and how to divert SIP traffic.

Figure 9:
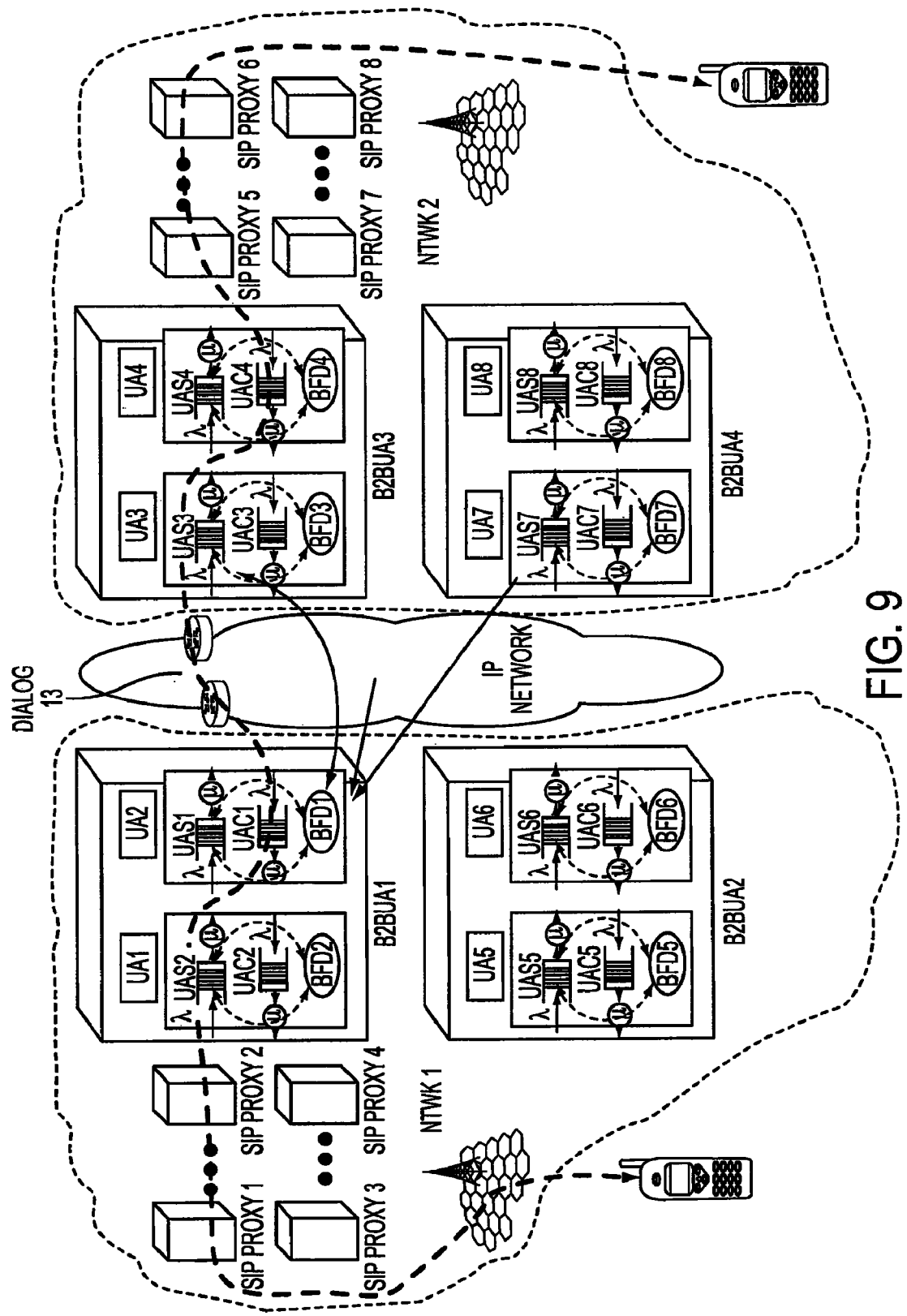
FIG. 9 is a logical network diagram useful in explaining optimal SIP routing in accordance with an M/M/1 Queuing Model.

This detailed description discusses taking an optimal network flow approach. Although examples are discussed that involve rerouting upon failure, for ease of illustration and discussion, determinations of optimal routing (and optimal alternate routes) rely on modeling each of the SIP servers as an M/M/1 queue, and the SIP traffic is therefore assumed to model a Poisson process as an example only. This approach works equally well to any packet distribution model. FIG. 9 is a logical network diagram illustrating optimal SIP routing in accordance with an M/M/1 Queuing Model.

The examples of finding the optimal SIP paths use the extension of the BFD process to continuously monitor status (available/unavailable) of communications, server backlog queues and the network latency and then let the BFD functionality decide the optimal SIP peers from the candidate of SIP peers that are already pre-configured as per original RFC 3261.

Figure 10:
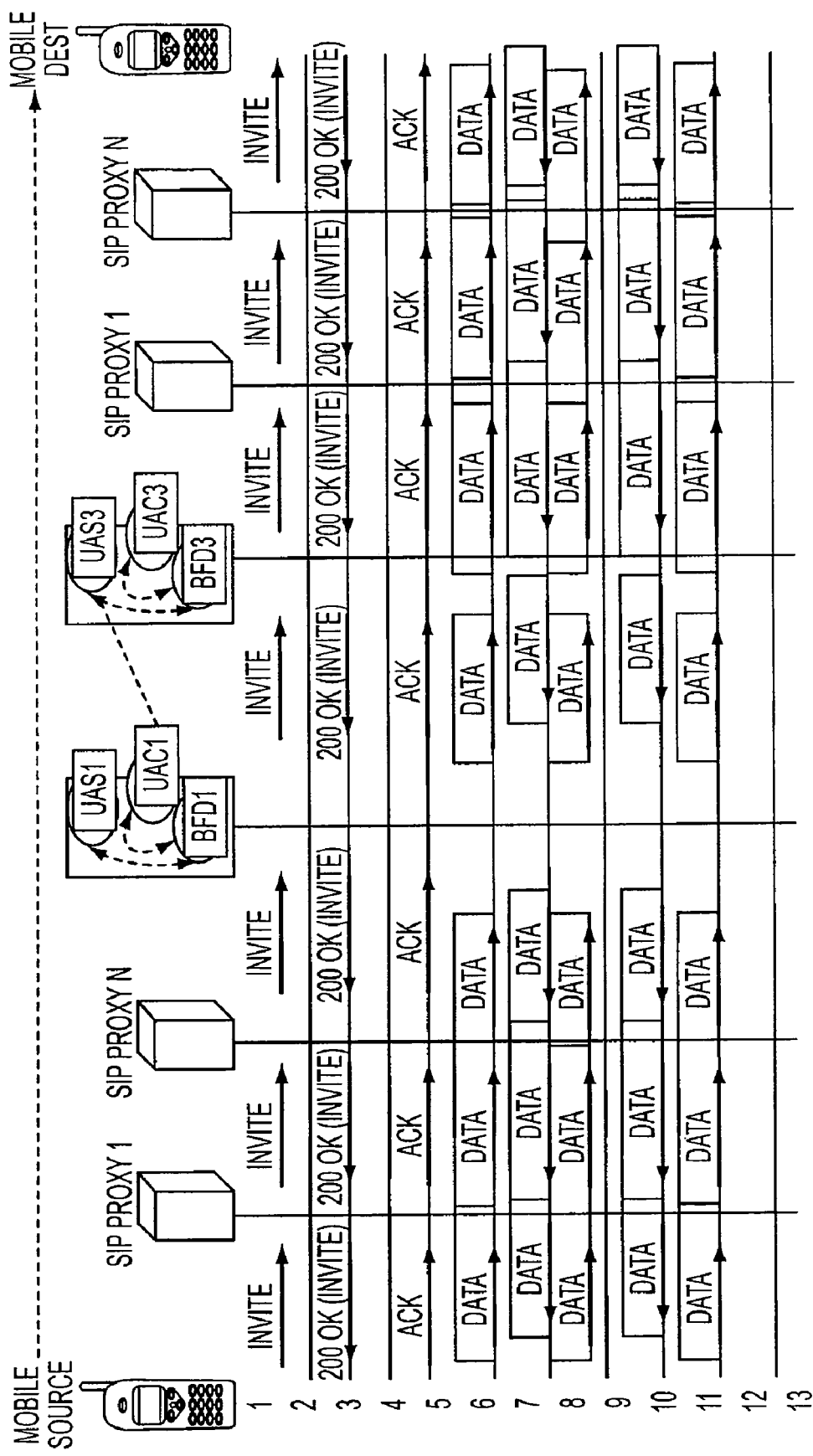
FIG. 10 is a signal flow diagram representing SIP optimal routing for a call, in a steady state (normal operations).

In FIG. 10, the BFD1 function runs on a device such as a SBC that is acting as a B2BUA. A similar functionality BFD3 runs on another device such as a SBC that is acting as a B2BUA. BFD1 is continuously monitoring the network latency and the queues of Peer SIP servers UAS3 and UAS7 to determine Server Loads, as well as network latencies from current BFD protocol implementations. BFD1 will then provide the appropriate optimal SIP Peering information to UAC1 to create a dialog with the appropriate and optimal SIP Peer.

Figure 7:
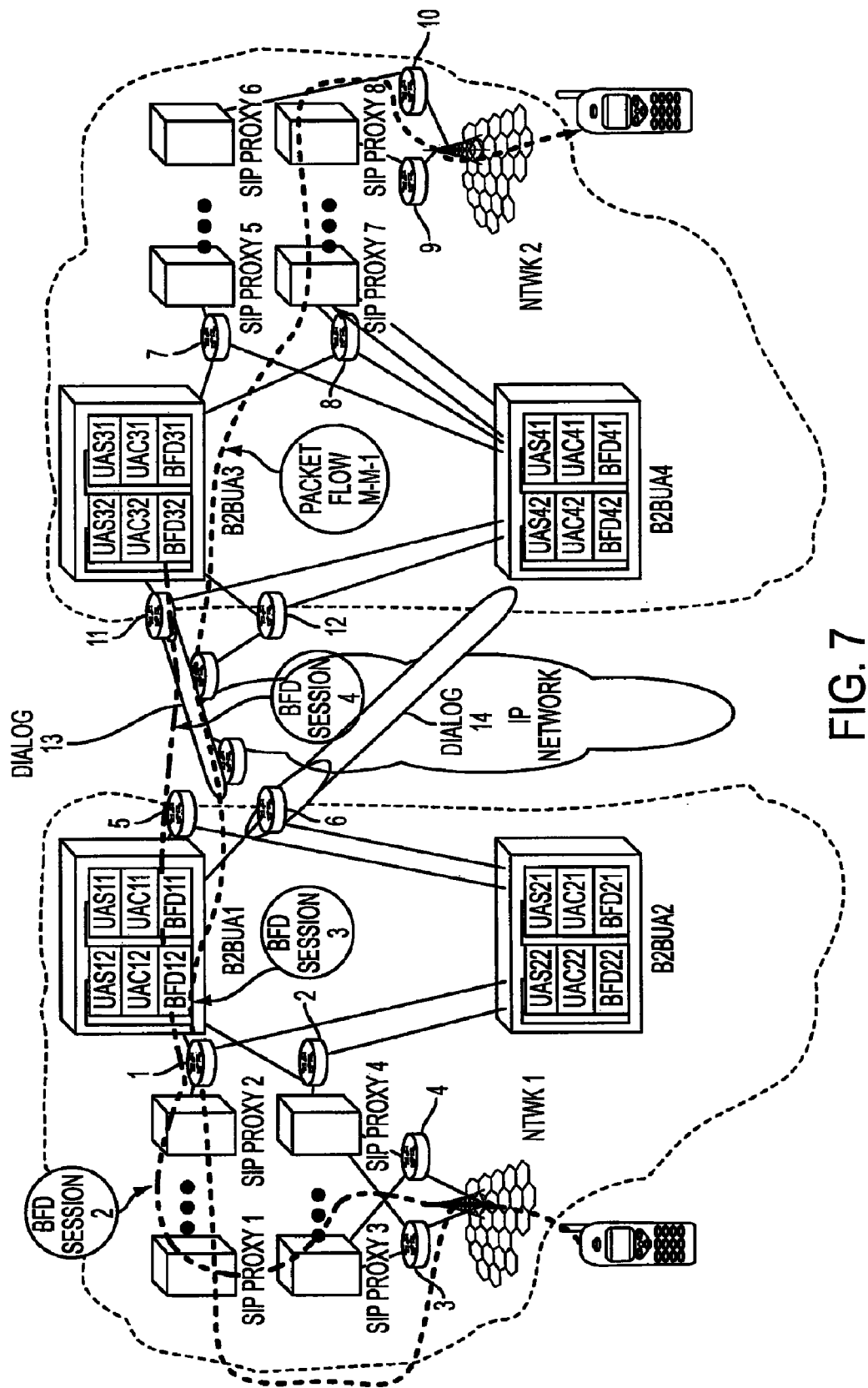
FIG. 7 is a logical network diagram showing mobile-to-mobile (M-M) packet flow, and BFD Sessions, during normal operations.
Figure 8:
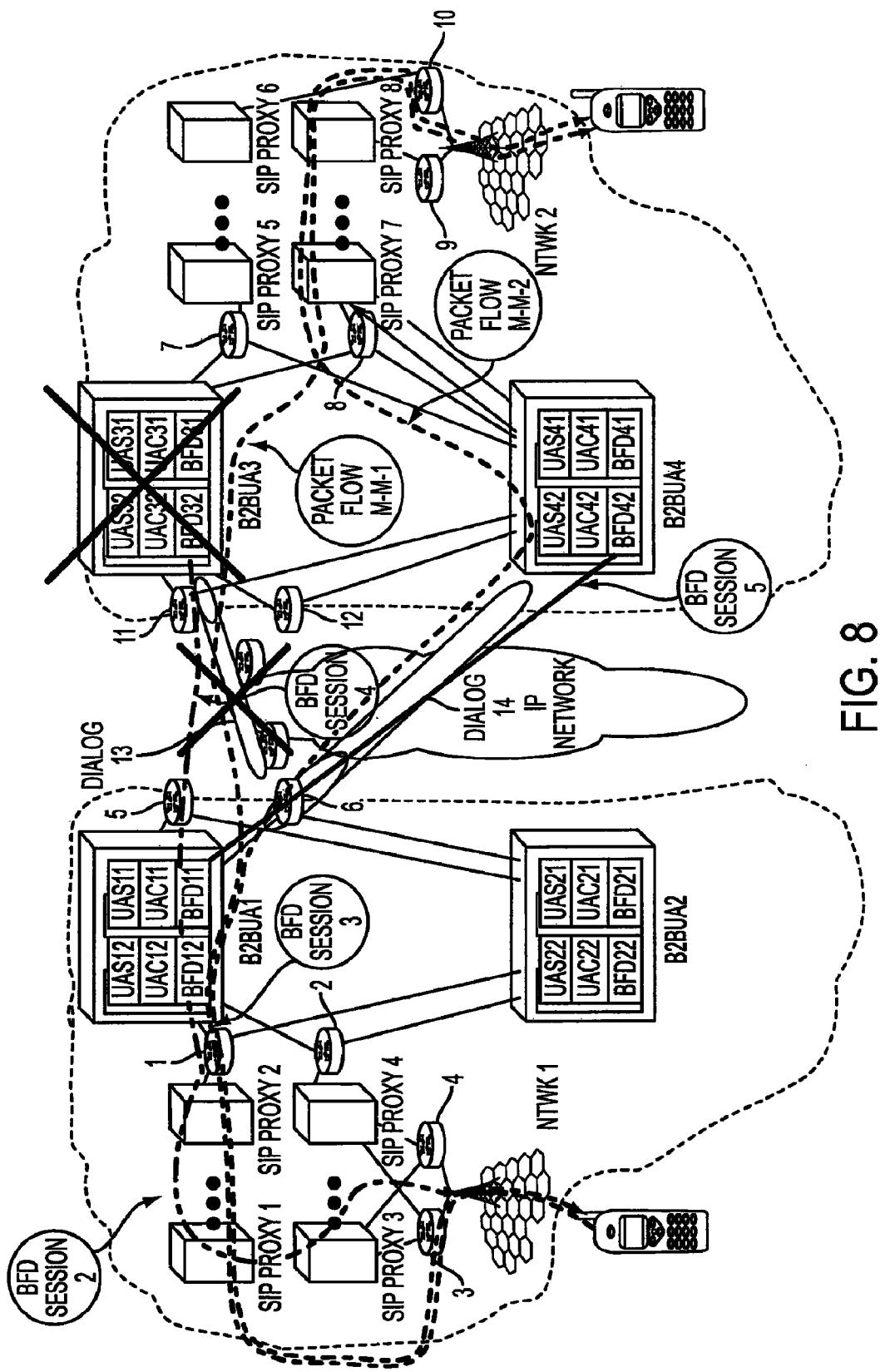
FIG. 8 is a logical network diagram, similar to that of FIG. 7, but showing operations in a failure mode.

FIGS. 7 and 8 show the basic packet flow for a mobile to mobile call, from one carrier to another. The following packet flows are defined:

1—The Packet Flow M-M 1 (dark dashed line)—represents the normal packet flow path for a Mobile to Mobile (M-M) call.

2—BFD Session 2 (dashed double dotted line)—This packet path represents the point to point BFD session from a router in the BSC or the MSC, right up to the BFD Peer process in the B2BUA1 box, which is typically implemented in a SBC. This is an end to end network health heart beat. The advantage of this approach is that only 1 unidirectional BFD session will be able to detect any failure in its path, that is not restored by a lower network layer mechanism, such as APS for example. The disadvantage of this approach, is the lack of granularity in identifying which particular segment has failed in this long path.

3—BFD Session 3 (dashed double dotted line)—This packet path represents the point to point BFD session from an adjacent router in the MSC, next to the BFD Peer process in the B2BUA1 box, which is typically implemented in a SBC. This is segmented network health heart beat. The disadvantage of this approach is that many segments will require piecemeal similar point to point connections, in order to detect all failures in the end to end path. If there are N nodes in the end to end path, then N+1 individual BFD sessions will be required for full coverage of the complete path. The advantage of this approach, is the level of granularity in identifying which particular segment has failed in this long path.

4—BFD Session 4 (dashed double dotted line)—This packet path represents the point to point BFD session from peering B2BUA devices, in this particular case we see that this BFD session is between B2BUA1 and its peer in the peering carrier network B2BUA3.

FIG. 8 also depicts the basic packet flow for a mobile to mobile call, from one carrier to another during a failure condition of either a Peering B2BUA link or a B2BUA device. The following new introduced packet flows are defined:

1—Packet Flow M-M 2 (added dark dashed line)—This line represents the new backup packet flow path for a Mobile to Mobile (M-M) call, when there is a failure on the primary path, in particular a failure due to Peering B2BUA link or a B2BUA device failure.

2—BFD Session 5 (added solid line)—This packet path represents the backup point to point BFD session from peering B2BUA devices, in this particular case we see that this BFD session is between B2BUA1 and its peer in the peering carrier network B2BUA4, where B2BUA3 has failed.

The integration of the currently implemented BFD processes in existing routers that support this and the newly introduced BFD processes on the B2BUA devices should be 100% compatible. However, in the exemplary implementation, the new BFD processes on the B2BUA devices also may have added functionality as follows:

1. the ability to detect congestion, latency;
2. the ability to pull SNMP data and other measurements to detect issues with peering SIP servers, that may affect SIP performance; and
3. the ability to perform other measurements to assist in identifying best SIP routes and any impact to optimal SIP traffic performance and cost.

The disclosed concepts are generic and intended to cover any specific implementation that takes any measurement to assist in determining the best SIP route, SIP peer etc.

Figure 11:
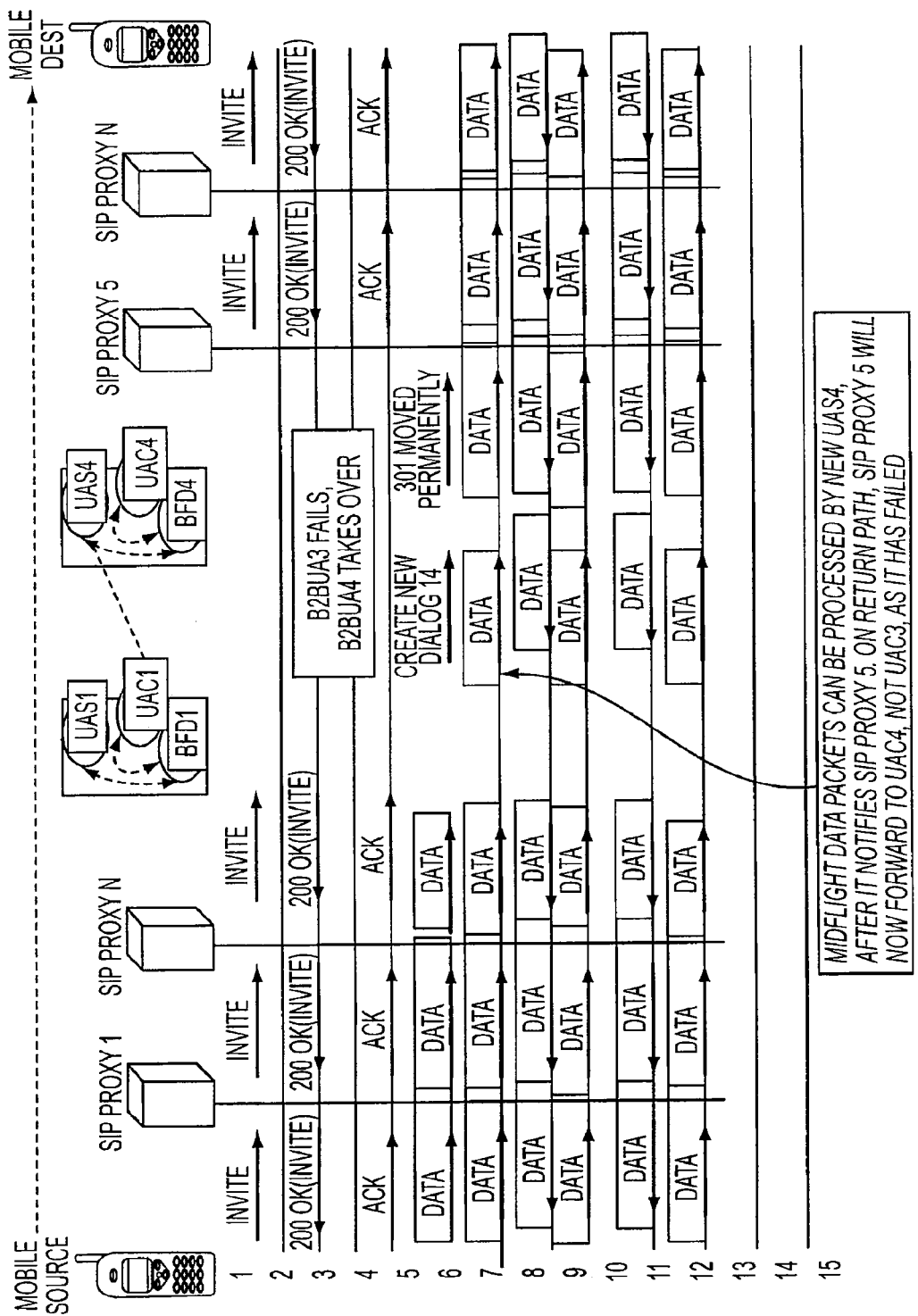
FIG. 11 is a signal flow diagram representing SIP optimal routing for a call, with rerouting due to a failure and limited cascaded event.

FIGS. 10 and 11 illustrate Call Flow sequences in more detail regarding the SIP messages that will be triggered from Steady state, Sub-optimal Network and Systems Detection and Finally Recovery action.

FIG. 10 shows the call setup, where there are N SIP proxies on the source and destination networks and there are B2BUA at the edge of each network. During this phase, we are assuming using SIP over UDP. The SIP Proxies do not need to maintain state, since there is enough information in the SIP message, such as the Via Header, to figure out the state associated with a call on an idempotent basis.

FIG. 11 shows that there is a problem on one side of the network, for example the B2BUA3 box failing completely. Now the BFD process on each B2BUA will be able to make a reroute decision to route SIP traffic in an optimal fashion. The first event to take place would be that a new dialog is setup, initiated by B2BUA1, who has detected the failure of B2BUA3 with B2BUA4 and create a new dialog session. Upon B2BUA4 realizing that it will take over traffic, that was originally going to B2BUA3, it will now notify SIP Proxy 5, to tell it that it will now forward SIP traffic originally going to B2BUA3, to B2BUA4.

This is the only splicing required, as the fault detection and recovery mechanisms are exploiting the information in the SIP packets to avoid taking massive cascading actions to recover from a failed B2BUA.

Another scenario, which can typically occur, is where one Service Provider has a deployed SBC controller, which contains an implementation of the B2BUA functions, peering with another provider who does not have an implementation of a B2BUA function but has a SIP Proxy.

Figure 12:
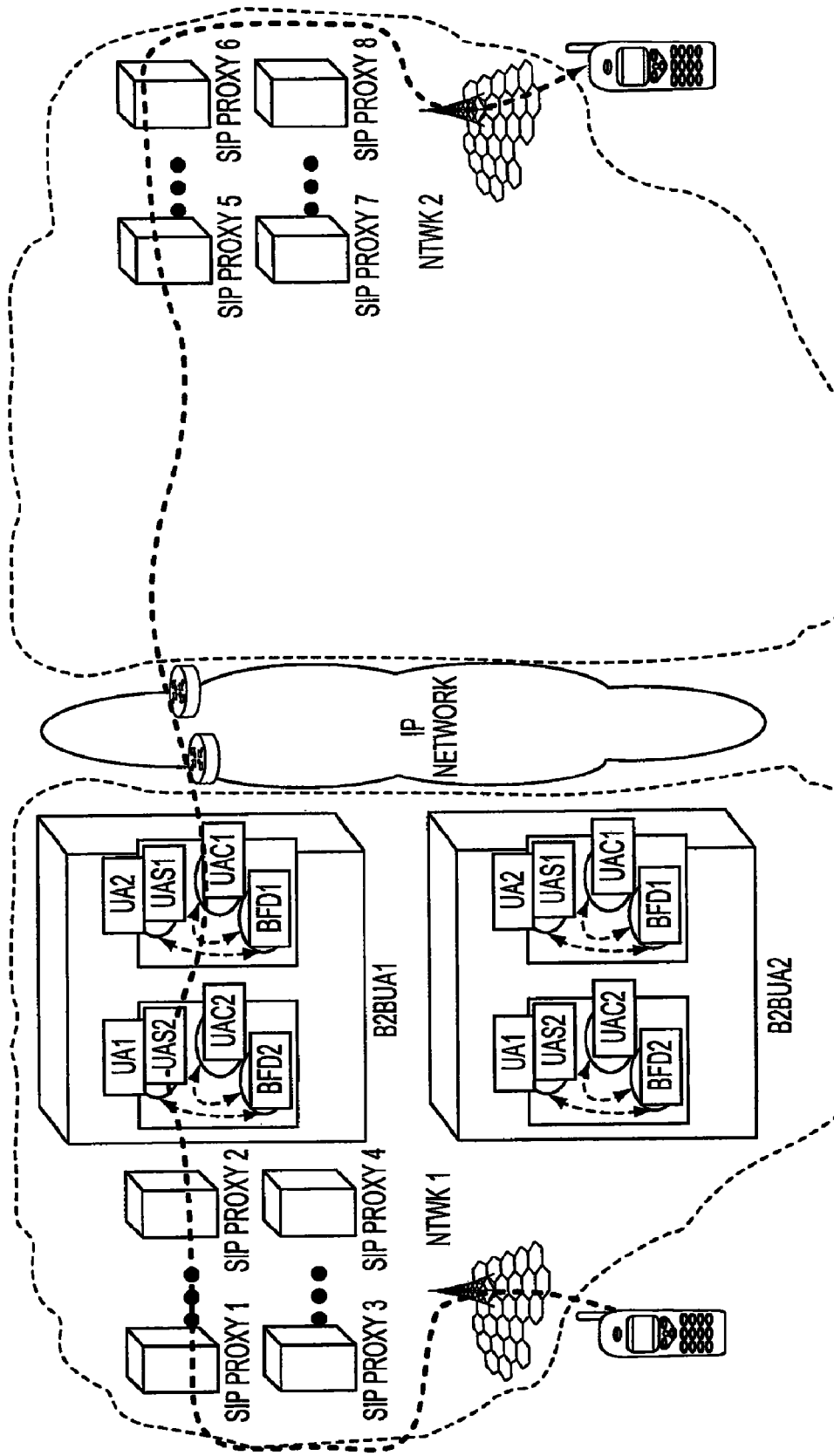
FIG. 12 is a logical network diagram useful in explaining a SIP Peering scenario involving a B2BUA and a SIP Proxy.

FIG. 12 shows a graphical example where one Service provider has a B2BUA function at its edge peering with another Service Provider, which only has a SIP Proxy. In the previous examples, we had a symmetrical scenario, where we could get away with describing the sequence of events in the case of one B2BUA redirecting SIP traffic to an alternate B2BUA. The actions and events of the failing B2BUA on one side of peering arrangements would be same if the other peering side experienced a failed B2BUA. However, in this scenario, it does make a difference and is somewhat more complicated.

Figure 13:
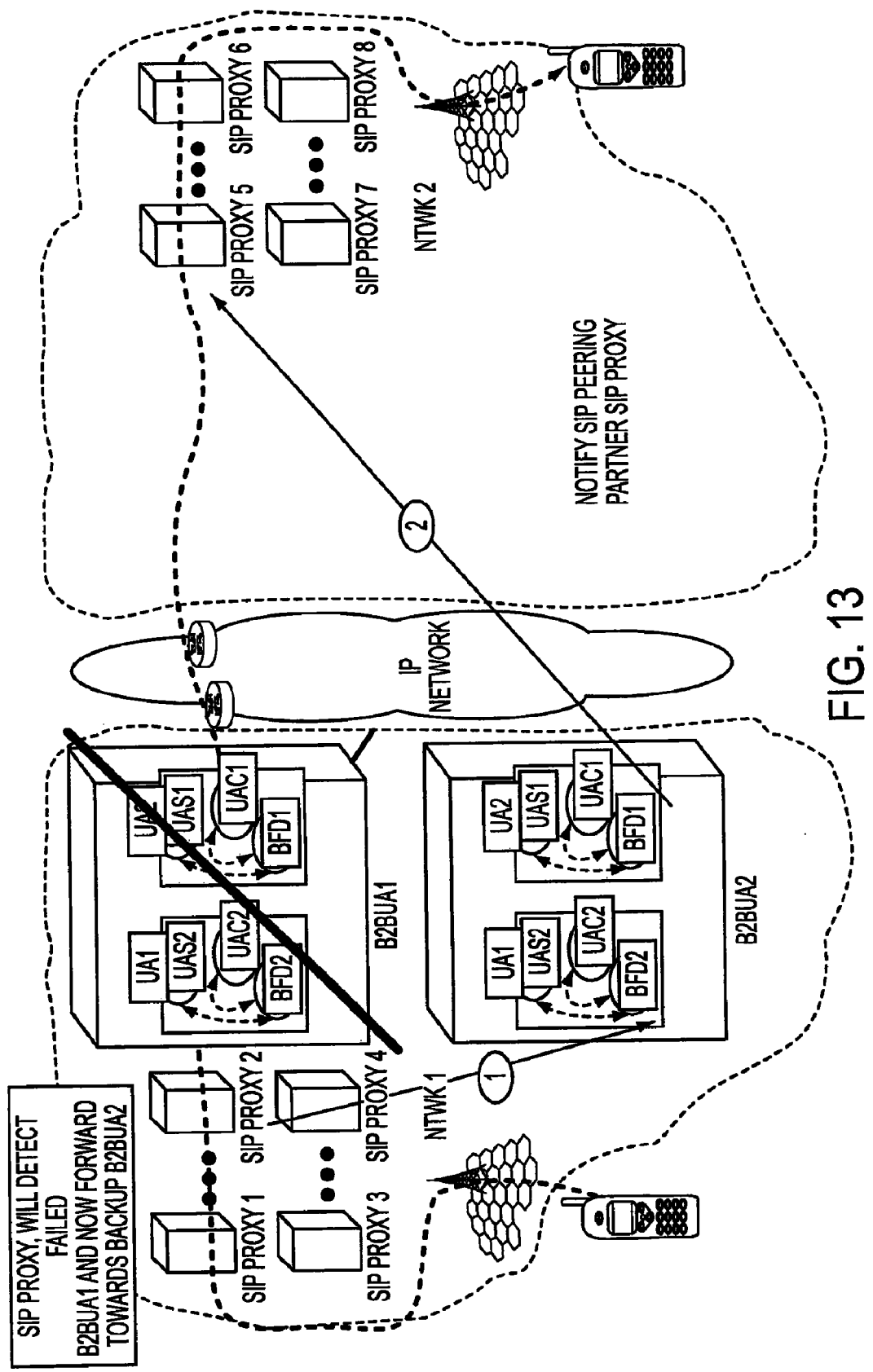
FIG. 13 is a logical network diagram useful in explaining processing in which a B2BUA fails and its backup notifies a remote SIP Proxy.

With respect to FIG. 13, assume now that B2BUA1 fails, and the remaining backup B2BUA2 reconnects SIP peering session with remote SIP Proxy. The SIP Proxy 2, will know when B2BUA1 fails, using existing technology, based on timers. However, the SIP Proxy 2 can also include the BFD process to detect failures much faster. This then would result in SIP Proxy 2 forwarding next hop SIP Traffic to the remaining surviving B2BUA2 box (step 1 on this drawing). The B2BUA2 box has at least 1 BFD process that detects that B2BUA1 has failed and knows to notify the remote SIP Peering SIP Proxy 5, by sending a SIP Method, extension Method Failure as one way to notify to the SIP Proxy that B2BUA1 has failed (step 2 in the drawing). In this way, the SIP proxy 5 is instructed to now peer with B2BUA2.

Figure 14:
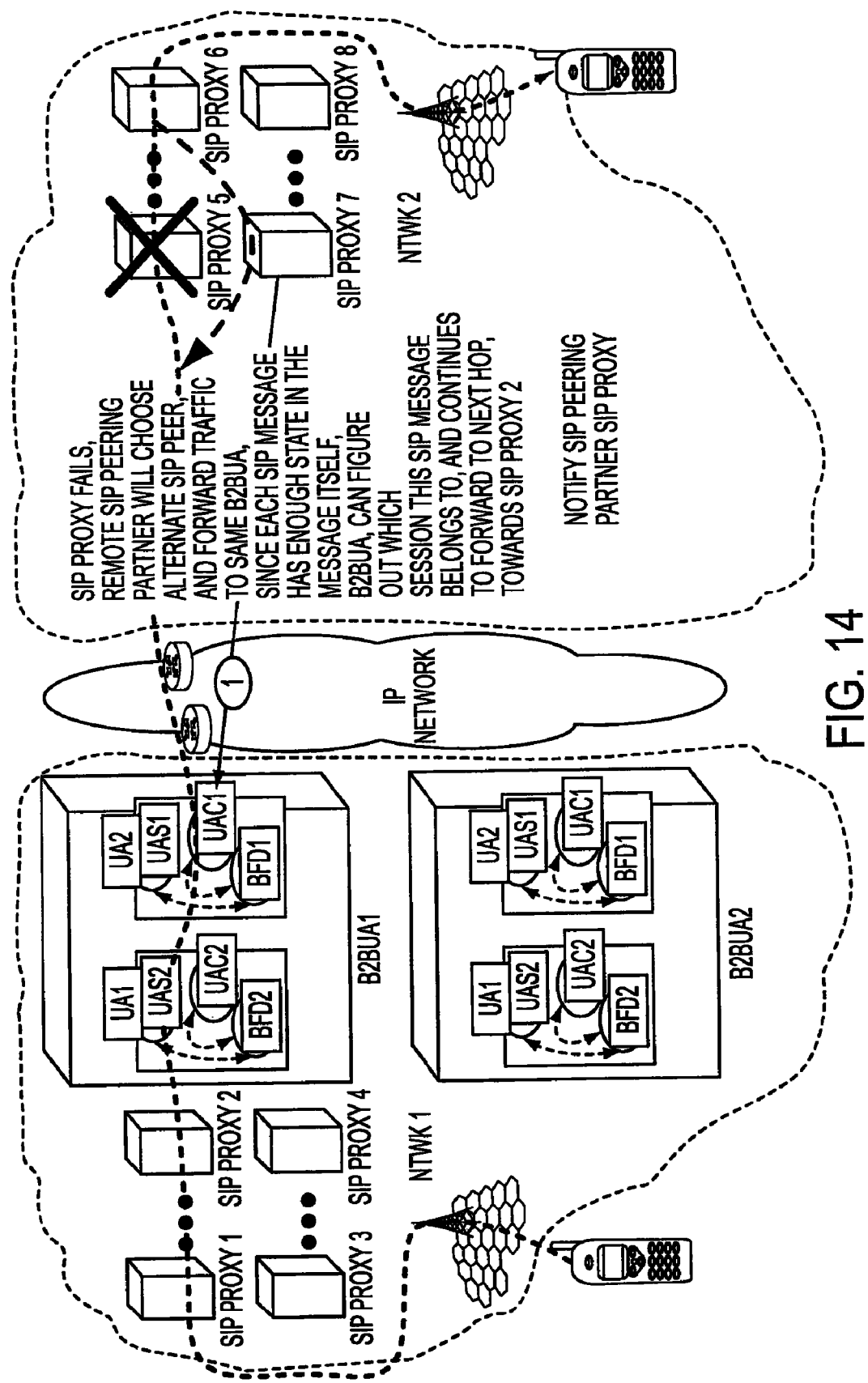
FIG. 14 is a logical network diagram useful in explaining processing in which a remote SIP proxy fails, but the B2BUA knows the state from the SIP messages.

With respect to FIG. 14, assume now that the remote SIP Proxy fails on the peering partner network (ntwk 2). The remote service provider will be responsible for finding an alternative, and can assume that a new SIP proxy will now forward traffic to the same B2BUA1. The SIP messages have enough state information, such as Cseq, Call ID, and Via messages, for the B2BUA1 box to figure out which message belongs to which session, regardless of this SIP Proxy the SIP message arrives from.

To implement this solution in the context of the relevant SIP standard, a new SIP Method would be added to RFC 3261, to indicate that a new dialog is created to take over a failed or suboptimal B2BUA. Also, we can insert the name of the SIP Proxy, that needs to be notified of the SIP failure, which we can input into the INFO method. The proposed extension to the SIP methods would be something like FAILURE, which will tell the receiving SIP B2BUA that a failure has occurred and it is asked to check INFO parameters for more info on what needs to be done. Another possible alternative would be to include the SIP proxies to be notified in the Via messages of the FAILURE method only. The NOTIFY method can possibly also provide a simpler approach, with additional sub extensions to indicate optimization rerouting requests.

Examples of several design options are as follows.

In a first example, SIP headers have a VIA field, which can tell the receiving B2BUA which signaling node to route the SIP request to. However, at the edge of the network, this will not work as one carrier has no information on the internal signaling nodes of the peering network.

A second example might use Route Headers RFC 3261, 20.30, P.174. The record route header fields are inserted by proxies in a request to force future requests in the dialog to be routed through the same path.

A third example might use Dialog—this is a logical SIP connection between 2 B2BUA, in particular between a UAC on B2BUA and a UAS on another. A dialog maintains necessary state for the routing and sequencing of messages between the UAC and UAS of different B2B2Uas. A dialog- ID (Call ID, local tag, remote tag) tracks individual sessions that are tunneled in a particular Dialog pipe.

Figure 15:
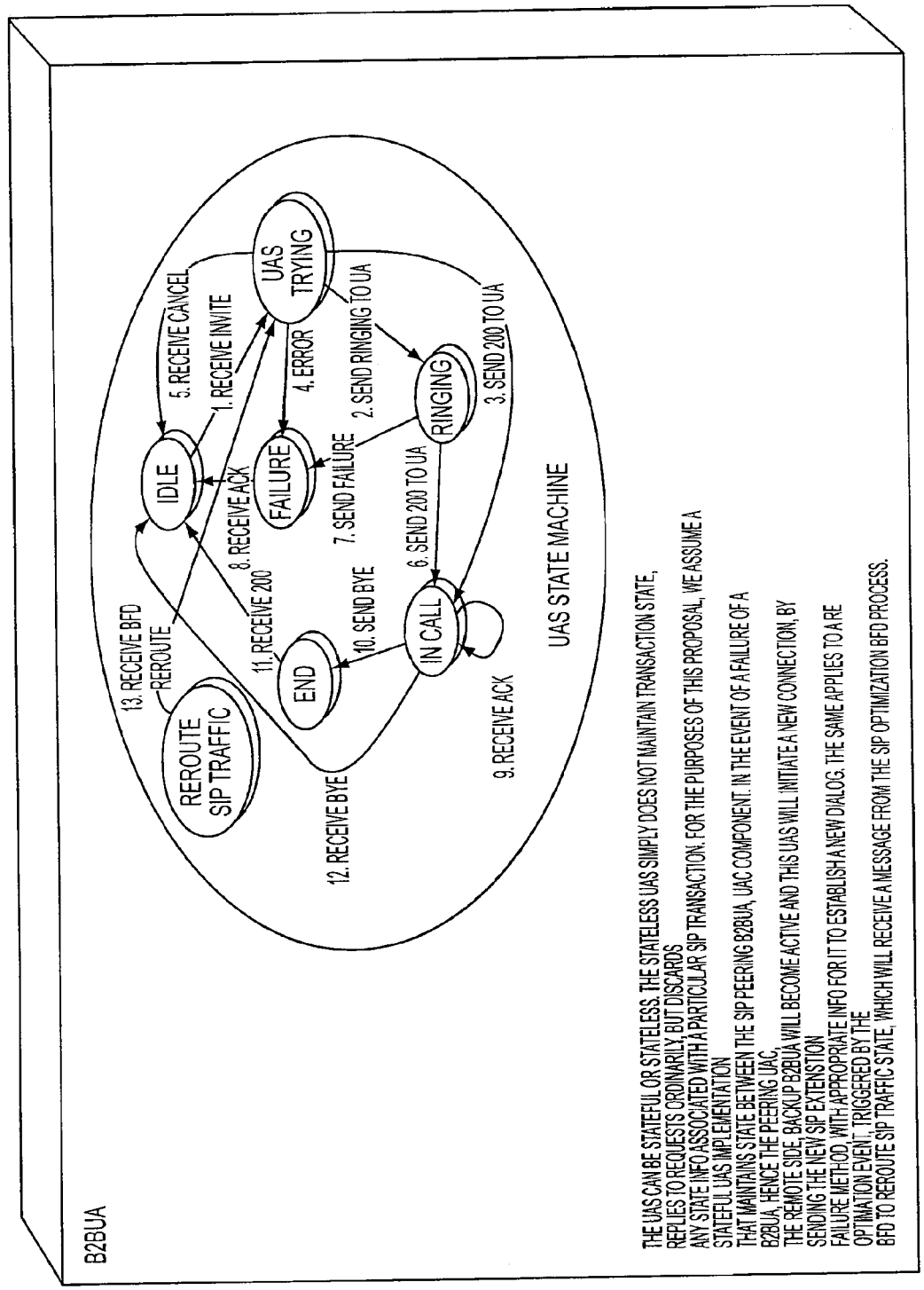
FIG. 15 is a state machine model representing a UAS (user agent server), which shows the SIP STATE Model Extension.

FIG. 15 shows an example of a state machine for a UAS, which shows the typical states, in addition to an example of an additional state to implement the SIP Routing Optimization functionality. As can be seen, the additional state receives an asynchronous event from the BFD extended process to initiate a SIP Reroute action. The UAS is implemented in a stateful manner. It is well documented that the stateful implementation is far more powerful, with the ability to do retransmissions, billing etc. Stateless implementation can only look at limited information in the SIP message itself and attempt to deduce the current state of a message mid-flight and reroute accordingly, with many grey areas.

Figure 16:
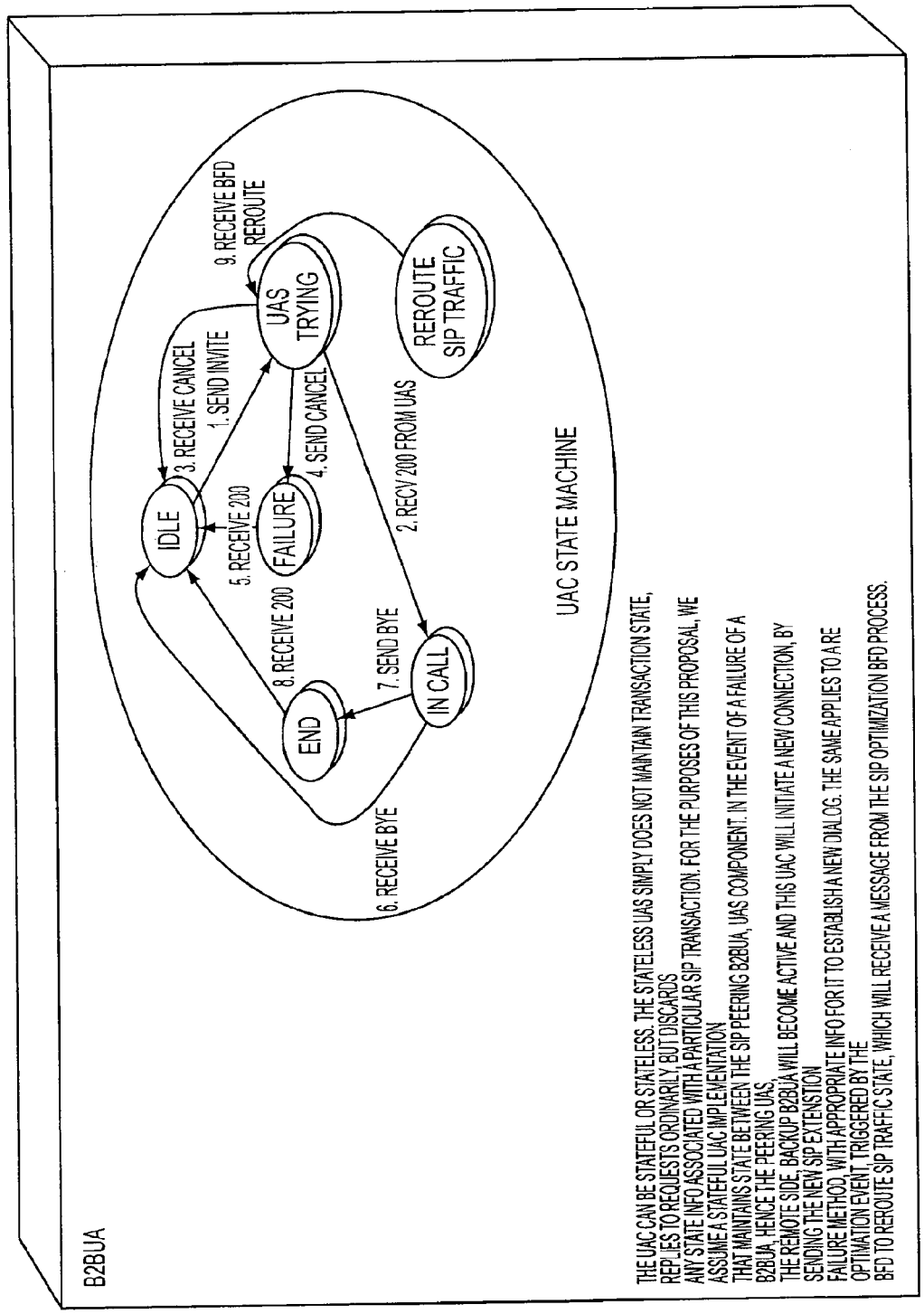
FIG. 16 is a state machine model representing a UAC (user agent client), which shows the SIP STATE Model Extension.

FIG. 16 shows an example of a state machine for a UAC, which shows the typical states, in addition to an example of an additional state that implements the SIP Routing Optimization functionality. As can be seen, the additional state receives an asynchronous event from the BFD extended process to initiate a SIP Reroute action. The UAC also is implemented in a stateful manner, due to the fact that if there is a failure, the session states to do retransmits and other details for a particular session are required to maintain continuous operations.

As shown by the above discussion, the functions relating to the monitoring and dynamic SIP routing may be implemented on computers connected for data communication via the components a packet data network 10. In most of the examples, the relevant functions are performed in a server or the like operating as an SBC providing B2BUA capabilities, such as SBC 45 or 47 shown in FIG. 1. Similar monitoring and dynamic routing may be implemented in SIP proxy servers, such as the server 43 in the example of FIG. 1. Whether an SBC or proxy server, such server devices for example, may be implemented using one or more hardware platforms intended to represent a general class of data processing device commonly used to run 'server' programming so as to implement the functions discussed above, albeit with an appropriate network connection for packet communication.

Figure 18:
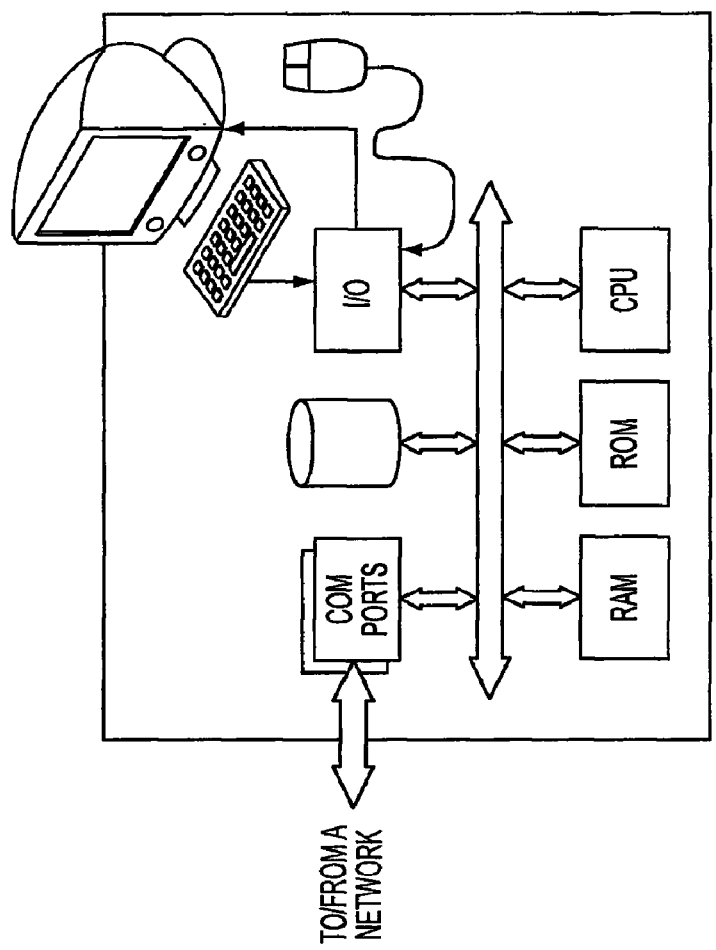
FIGS. 17 and 18 are simplified functional block diagrams of exemplary general purpose computers, as may be used to monitor the condition of network components involved in session signaling plan and to dynamically route/reroute session-related signaling traffic.
Figure 17:
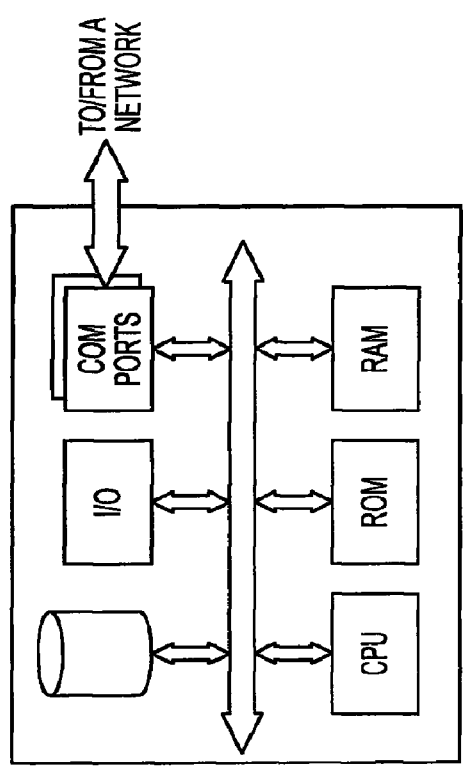

FIGS. 17 and 18 provide functional block diagram illustrations of general purpose computer hardware platforms. FIG. 17 illustrates a network or host computer platform, as may typically be used to implement a server. FIG. 18 depicts a computer with user interface elements, as may be used to implement a personal computer or other type of work station, although the computer of FIG. 18 may also act as a server if appropriately programmed. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

At a high level, a computer operating as a server, for example, includes a data communication interface for packet data communication. The server computer also includes a central processing unit ("CPU"), in the form of one or more processors, for executing program instructions. The hardware also includes an internal communication bus as well as various types of memory or storage media (RAM, ROM, EEPROM, cache memory, disk drives, etc.) for code and data storage. The software functionalities involve programming, including executable code as well as associated stored data, e.g. SIP routing tables identifying peer signaling nodes. The software code is executable by the CPU or other processor of the general-purpose computer that functions as the server. In operation, the code is stored within the general-purpose computer platform. At other times, however, the software may be stored at other locations and/or transported for loading into the appropriate general-purpose computer system, e.g. via electrical communication media. Execution of programming by a processor of the computer platform enables the platform to implement the methodology for the monitoring and dynamic SIP routing, in essentially the manner performed in the implementations discussed and illustrated herein. As used herein, terms such as computer or machine "readable medium" refer to any medium that participates in providing instructions to a processor for execution.

Hence, aspects of the methods outlined above may be embodied in programming, e.g. in the form of software, firmware, or microcode executable by a server or other programmable device. Such programming typically is carried on or otherwise embodied in a medium or media, e.g. stored in a storage type medium. Terms such as "machine-readable" and "computer-readable" medium as used herein generically refer to any tangible medium that participates in providing instructions and/or data to a programmable processor, such as the CPU or other processor of a server computer or user terminal device, for execution or other processing. Such a medium may take many forms, including but not limited to, non-volatile storage media and volatile storage media. Non-volatile storage media include, for example, optical or magnetic disks and flash memory. Volatile storage media include dynamic memory, such as main memory or cache. Hence, common forms of machine-readable storage media include, for example, a floppy disk, a flexible disk, a hard disk, a magnetic tape, any other magnetic medium, a CD or CDROM, a DVD or DVD-ROM, any other optical medium, punch cards, paper tape, any other physical medium with patterns of holes, a RAM, a PROM, an EPROM, an EEPROM, a FLASH-EPROM, a cache memory, or any other memory chip or cartridge.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX

Acronym List

The description above has used a large number of acronyms to refer to various services, messages and system components. Although generally known, use of several of these acronyms is not strictly standardized in the art. For the convenience of the reader, the following list correlates terms to acronyms, as used in the detailed description above.

1xEV-DO—Single Carrier, Evolution-Data Only
3GPP2—Third Generation Partnership Project 2
AAA—Authentication, Authorization, and Accounting (AAA)
ACK—Acknowledgement
APS—Automatic Protection Switching
B2BUA—Back-to-Back User Agent
BFD—Bidirectional Forwarding Detection
BS—Base Stations
BTS—Base Transceiver System
CD—Compact Disk
CDROM—Compact Disk Read Only Memory
CPU—Central Processing Unit
Cseq—Command sequence DOM—Data Optimized Module
DVD—Digital Video Disk
DVD-ROM—Video Disk Read Only Memory
EEPROM—Electronically Erasable Programmable Read Only Memory
EPROM—Erasable Programmable Read Only Memory
FA—Foreign Agent
GGSN—Gateway GPRS Support Node
GPRS—General Packet Radio Service
GSM—Global System for Mobile communications
HA—Home Agent
HPRD—High Rate Packet Data Interface
IETF—Internet Engineering Taskforce
ID—Identification
IP—Internet Protocol
LAN—Local Area Network
MS—Mobile Station
MSC—Mobile Switching Center
PC—Personal Computer
PDA—Personal Digital Assistant
PDSN—Packet Data Serving Node
PPP—Point to Point Protocol
PROM—Programmable Read Only Memory
RAM—Random Access Memory
RFC—Request for Comments
RNC—Radio Network Controller
ROM—Read Only Memory
SBC—Session Border Controller
SIP—Session Initiation Protocol
TDMA—Time Division Multiple Access
UA—User Agent
UAC—User Agent Client
UAS—User Agent Server
UDP—User Datagram Protocol
VoIP—Voice over Internet Protocol
WAN—Wide Area Network

What is claimed is:

1. A method of selectively routing signaling messages related to one or more multimedia sessions for at least one user, through a packet communication network, the method comprising steps of:
   at a first session initiation protocol (SIP) signaling node configured to provide a back-to-back user agent (B2BUA) function, monitoring at least two parameters relating to communications of session initiation protocol (SIP) signaling messages of the B2BUA function with each of a plurality of other SIP signaling nodes via the packet communication network, each of the other SIP signaling nodes being configured to provide a B2BUA function,
   wherein the at least two parameters relating to communication of the SIP signaling messages with each of the other SIP signaling nodes comprise two or more parameters selected from the group consisting of:
      (1) availability/unavailability status of communication with each of the other SIP signaling nodes;
      (2) congestion with respect to communication with each of the other SIP signaling nodes;
      (3) latency impacting communication with each of the other SIP signaling nodes; and
      (4) cost of communication with each of the other SIP signaling nodes;
   based on the monitoring of the parameters, identifying one of the other SIP signaling nodes as having optimal communications of SIP signaling messages; and
   communicating SIP signaling messages regarding one or more of the multimedia sessions to or from the first SIP signaling node with the identified other SIP signaling node via the packet communication network.

2. The method of claim 1, further comprising steps of:
   establishing a respective session through the packet communication network with each of the other SIP signaling nodes; and
   periodically exchanging health related messages with each of the other SIP signaling nodes via the respective session through the packet communication network;
   wherein the monitoring step is at least partially responsive to monitoring of packets received from health related messages from the each of the other SIP signaling nodes via the respective session through the packet communication network.

3. The method of claim 2, wherein the establishing of the respective session with each of the other SIP signaling nodes and the exchanging of health related messages with each of the other SIP signaling nodes utilize Bidirectional Forwarding Detection (BFD) protocol.

4. The method of claim 1, wherein the first SIP signaling node comprises a session border controller (SBC).

5. The method of claim 1, wherein:
   the packet communication network is a packet based mobile wireless communication network; and
   each multimedia session comprises a session to or from a mobile User Agent (UA) device.

6. The method of claim 5, wherein the mobile wireless communication network uses a 3GPP2 1xEV-DO network architecture.

7. A session border controller configured as a first session initiation protocol (SIP) signaling node to provide a back-to-back user agent (B2BUA) function for session initiation protocol (SIP) signaling via a packet communication network, the session border controller comprising:
   a communication interface for connection to the packet communication network;
   a central processing unit coupled to the communication interface for signaling communication via the packet communication network;
   storage coupled central processing unit; and
   programming in the storage for execution by the central processing unit,
   wherein execution of the programming by the central processing unit causes the central processing unit to operate the session border controller to implement a sequence of steps for selectively routing SIP signaling messages related to one or more multimedia sessions for at least one user, through the packet communication network, the sequence of steps comprising:
   (a) monitoring at least two parameters relating to communications of SIP signaling messages with each of a plurality of other SIP signaling nodes via the packet communication network, each of the other SIP signaling nodes being configured to provide a B2BUA function,
   wherein the at least two parameters relating to communication of the SIP signaling messages with each of the other SIP signaling nodes comprise two or more parameters selected from the group consisting of:
      (1) availability/unavailability status of communication with each of the other SIP signaling nodes;
      (2) congestion with respect to communication with each of the other SIP signaling nodes;
      (3) latency impacting communication with each of the other SIP signaling nodes; and
      (4) cost of communication with each of the other SIP signaling nodes;

(b) based on the monitoring of the parameters, identifying one of the other SIP signaling nodes as having optimal communications of SIP signaling messages; and (c) communicating SIP signaling messages regarding one or more of the multimedia sessions to or from the first SIP signaling node with the identified other SIP signaling node via the packet communication network.

8. A program product comprising:

a non-transitory machine readable storage medium medium, and programming embodied in the medium, wherein execution of the programming by a device configured as a first session initiation protocol (SIP) signaling node coupled to a packet communication network and configured to provide a back-to-back user agent (B2BUA) function causes the device to implement a sequence of steps for selectively routing signaling messages related to one or more multimedia sessions for at least one user, through the packet communication network, the sequence of steps comprising:

monitoring at least two parameters relating to communications of SIP signaling messages of the B2BUA function with each of a plurality of other SIP signaling nodes via the packet communication network, each of the other SIP signaling nodes being configured to provide a B2BUA function, wherein the at least two parameters relating to communication of the SIP signaling messages with each of the other SIP signaling nodes comprise two or more parameters selected from the group consisting of:

(1) availability/unavailability status of communication with each of the other SIP signaling nodes;

(2) congestion with respect to communication with each of the other SIP signaling nodes;

(3) latency impacting communication with each of the other SIP signaling nodes; and (4) cost of communication with each of the other SIP signaling nodes;

based on the monitoring of the parameters, identifying one of the other SIP signaling nodes as having optimal communications of SIP signaling messages; and communicating SIP signaling messages regarding one or more of the multimedia sessions to or from the first SIP signaling node with the identified other SIP signaling node via the packet communication network.

9. A method of selectively rerouting signaling messages related to one or more multimedia sessions for at least one user, through a packet communication network, the method comprising steps of:

at a first session initiation protocol (SIP) signaling node configured to provide a back-to-back user agent (B2BUA) function, communicating SIP signaling messages regarding one or more of the multimedia sessions with a second SIP signaling node configured to provide a B2BUA function via the packet communication network;

monitoring at least two parameters relating to communication of the SIP signaling messages with the second SIP signaling node via the packet communication network, wherein the at least two parameters relating to communication of the SIP signaling messages with the second SIP signaling node comprise two or more parameters selected from the group consisting of:

(1) availability/unavailability status of communication with each of the second SIP signaling node;

(2) congestion with respect to communication with the second SIP signaling node;

(3) latency impacting communication with each of the second SIP signaling node; and (4) cost of communication with each of the second SIP signaling node;

based on the monitoring of parameters, determining when communication of the SIP signaling messages with the second SIP signaling node is interrupted or is subject to less than a desired level of performance;

in response to the step of determining, selecting an alternate SIP signaling node configured to provide a B2BUA function; and transferring the communication of the SIP signaling messages of the first SIP signaling node regarding the one or more of the multimedia sessions to the alternate SIP signaling node.

10. The method of claim 9, further comprising steps of:

establishing a session through the packet communication network with the second SIP signaling node; and periodically exchanging health related messages with the second SIP signaling node via the session through the packet communication network;

wherein the monitoring step is at least partially responsive to monitoring of packets received from health related messages from the second SIP signaling node via the session through the packet communication network.

11. The method of claim 10, wherein the establishing of the session with the second signaling node and the exchanging of health related messages with the second SIP signaling node utilize Bidirectional Forwarding Detection (BFD) protocol.

12. The method of claim 9, further comprising:

monitoring at least two parameters relating to a communication of SIP signaling messages with the alternate SIP signaling node via the packet communication network;

wherein the selecting is based at least in part on the monitoring of the at least two parameters relating to the communication of SIP signaling messages with the alternate SIP signaling node.

13. The method of claim 9, wherein the first SIP signaling node comprises a session border controller (SBC).

14. The method of claim 9, wherein:

the packet communication network is a packet based mobile wireless communication network; and each multimedia session comprises a session to or from a mobile User Agent (UA) device.

15. The method of claim 14, wherein the mobile wireless communication network uses a 3GPP2 1xEV-DO network architecture.

16. The method of claim 9, further comprising:

at the first SIP signaling node, further monitoring the at least two parameters relating to communications of SIP signaling messages of the B2BUA function with each of a plurality of other SIP signaling nodes configured to provide a B2BUA function, wherein the selecting step comprises:

based on the further monitoring, identifying one of the other SIP signaling nodes as having optimal communications of SIP signaling messages, and selecting the identified other SIP signaling node as the alternate SIP signaling node.

17. A session border controller configured as a first session initiation protocol (SIP) signaling node to provide a back-to-back user agent (B2BUA) function for SIP signaling via a packet communication network, the session border controller comprising:

a communication interface for connection to the packet communication network;

a central processing unit coupled to the communication interface for signaling communication via the packet communication network;

storage coupled central processing unit; and programming in the storage for execution by the central processing unit, wherein execution of the programming by the central processing unit causes the central processing unit to operate the session border controller to implement a sequence of steps for selectively routing SIP signaling messages related to one or more multimedia sessions for at least one user, through the packet communication network, the sequence of steps comprising:

(a) communicating SIP signaling messages regarding one or more of the multimedia sessions with a second SIP signaling node configured to provide a B2BUA function via the packet communication network;

(b) monitoring at least two parameters relating to communication of the SIP signaling messages with the second SIP signaling node via the packet communication network, wherein the at least two parameters relating to communication of the SIP signaling messages with the second SIP signaling node comprise two or more parameters selected from the group consisting of:
  (1) availability/unavailability status of communication with each of the second SIP signaling node;
  (2) congestion with respect to communication with the second SIP signaling node;
  (3) latency impacting communication with each of the second SIP signaling node; and
  (4) cost of communication with each of the second SIP signaling node;

(c) based on the monitoring of parameters, determining when communication of the SIP signaling messages with the second SIP signaling node is interrupted or is subject to less than a desired level of performance;

(d) in response to the step of determining, selecting an alternate SIP signaling node configured to provide a B2BUA function; and (e) transferring the communication of the SIP signaling messages of the first SIP signaling node regarding the one or more of the multimedia sessions to the alternate SIP signaling node.

18. A program product comprising:

a non-transitory machine readable storage medium, and programming embodied in the medium, wherein execution of the programming by a device configured as a first session initiation protocol (SIP) signaling node coupled to a packet communication network and configured to provide a back-to-back user agent (B2BUA) function causes the device to implement a sequence of steps for selectively rerouting signaling messages related to one or more multimedia sessions for at least one user, through the packet communication network, the sequence of steps comprising:

communicating SIP signaling messages regarding one or more of the multimedia sessions with a second SIP signaling node configured to provide a B2BUA function via the packet communication network;

monitoring at least two parameters relating to communication of the SIP signaling messages with the second SIP signaling node via the packet communication network, wherein the at least two parameters relating to communication of the SIP signaling messages with the second SIP signaling node comprise two or more parameters selected from the group consisting of:
  (1) availability/unavailability status of communication with each of the second SIP signaling node;
  (2) congestion with respect to communication with the second SIP signaling node;
  (3) latency impacting communication with each of the second SIP signaling node; and
  (4) cost of communication with each of the second SIP signaling node;

based on the monitoring of parameters, determining when communication of the SIP signaling messages with the second SIP signaling node is interrupted or is subject to less than a desired level of performance;

in response to the step of determining, selecting an alternate SIP signaling node configured to provide a B2BUA function; and transferring the communication of the SIP signaling messages of the first SIP signaling node regarding the one or more of the multimedia sessions to the alternate SIP signaling node.

* * * * *

UNITED STATES PATENT AND TRADEMARK OFFICE
CERTIFICATE OF CORRECTION

Page 1 of 1

PATENT NO.        : 7,821,923 B2
APPLICATION NO.   : 12/026989
DATED             : October 26, 2010
INVENTOR(S)       : Deepak Kumar Kakadia et al.

It is certified that error appears in the above-identified patent and that said Letters Patent is hereby corrected as shown below:

In the Claims

In Claim 8, column 19, line 9, please delete the word "MEDIUM" between the words "storage" and "and" as follows:

--non-transitory machine readable storage medium [[medium]], and--

Signed and Sealed this
Thirteenth Day of May, 2014

Michelle K. Lee
*Deputy Director of the United States Patent and Trademark Office*